Sept. 4, 1962 J. A. THOMAS 3,052,336

TYPEWRITER ACCOUNTING MACHINE WITH CARD PUNCH ADJUNCT

Filed Sept. 4, 1959 13 Sheets-Sheet 1

INVENTOR.
JAMES A. THOMAS
BY
J P Santo
ATTORNEY.

TYPEWRITER ACCOUNTING MACHINE WITH CARD PUNCH ADJUNCT

Filed Sept. 4, 1959 13 Sheets-Sheet 2

INVENTOR.
JAMES A. THOMAS
BY
J P Santo
ATTORNEY.

INVENTOR.
JAMES A. THOMAS
BY
J P Santo
ATTORNEY.

INVENTOR.
JAMES A. THOMAS
BY
J.P. Santo
ATTORNEY.

TYPEWRITER ACCOUNTING MACHINE WITH CARD PUNCH ADJUNCT

Filed Sept. 4, 1959

INVENTOR.
JAMES A. THOMAS
BY
J.P. Santo
ATTORNEY.

TYPEWRITER ACCOUNTING MACHINE WITH CARD PUNCH ADJUNCT

Filed Sept. 4, 1959

INVENTOR.
JAMES A. THOMAS
BY
JP Santo
ATTORNEY.

Sept. 4, 1962   J. A. THOMAS   3,052,336
TYPEWRITER ACCOUNTING MACHINE WITH CARD PUNCH ADJUNCT
Filed Sept. 4, 1959   13 Sheets-Sheet 7

INVENTOR.
JAMES A. THOMAS
BY
*J. P. Santo*
ATTORNEY.

TYPEWRITER ACCOUNTING MACHINE WITH CARD PUNCH ADJUNCT

Filed Sept. 4, 1959

INVENTOR.
JAMES A. THOMAS
BY
J P Santo
ATTORNEY.

INVENTOR.
JAMES A. THOMAS
BY
J P Santo
ATTORNEY.

Sept. 4, 1962      J. A. THOMAS      3,052,336
TYPEWRITER ACCOUNTING MACHINE WITH CARD PUNCH ADJUNCT
Filed Sept. 4, 1959      13 Sheets-Sheet 9

INVENTOR.
BY
ATTORNEY.

INVENTOR.
JAMES A. THOMAS
BY
J P Santo
ATTORNEY.

TYPEWRITER ACCOUNTING MACHINE WITH CARD PUNCH ADJUNCT

Filed Sept. 4, 1959 13 Sheets-Sheet 11

CONTROL UNIT - 6 FIG. 1.

INVENTOR.
JAMES A. THOMAS
BY
J P Santo
ATTORNEY.

TYPEWRITER ACCOUNTING MACHINE WITH CARD PUNCH ADJUNCT

Filed Sept. 4, 1959

INVENTOR.
JAMES A. THOMAS
BY
J P Santo
ATTORNEY.

TYPEWRITER ACCOUNTING MACHINE WITH CARD PUNCH ADJUNCT

Filed Sept. 4, 1959

INVENTOR.
JAMES A. THOMAS
BY
J P Santo
ATTORNEY.

United States Patent Office 3,052,336
Patented Sept. 4, 1962

3,052,336
TYPEWRITER ACCOUNTING MACHINE WITH CARD PUNCH ADJUNCT

James A. Thomas, Garden City, Mich., assignor to Burroughs Corporation, Detroit, Mich., a corporation of Michigan Filed Sept. 4, 1959, Ser. No. 838,331
23 Claims. (Cl. 197—1.6)

This invention relates generally to accounting apparatus of the type including a typewriter-accounting machine and a record punching machine, and more particularly to inter-coupling control means for controlling alphabetical operations of the punching machine directly from the typewriter and producing a punched record as a by-product of the operations thereof.

In applicant's co-pending applications S.N. 626,765 and S.N.747,005, now Patent No. 2,998,914 filed December 6, 1956 and July 7, 1958, there are disclosed inter-coupling control means for an accounting machine and a card punch machine for numerical operation of the punching machine directly from the accounting machine. The inter-coupler of the present invention may be employed for the typewriter section of a combined typewriter-accounting or calculating machine of the type disclosed in co-pending U.S. patent application S.N. 738,250 entitled, Calculating and Typewriter Printing Machine, filed May 21, 1958 for Louis J. Gavasso, of common ownership herewith, now Patent No. 2,936,703 and may be added readily to the inter-couplers of applicant's aforesaid applications to provide alphabetical punching in addition to numerical punching control of a punching machine directly from a combined typewriter-accounting machine.

The invention has for its general object to provide an improved inter-coupling means for apparatus of the above character.

A specific object of the invention is to provide an inter-coupling control means in which alphabetical punching operation of a record card punching machine initiated from a typewriter operation is continued for successive letter space operations of the typewriter over punching fields co-extensive with or less than the typing fields of the typewriter.

Another object of the invention is to provide an inter-coupling control means for apparatus of the above character in which abbreviated record card punchings may be effected in the punching machine from unabbreviated or full word typing operations of the typewriter and in which such abbreviated punchings may be accomplished for and over any number of full words or quantities being typed in a typing field of the typewriter.

Still another object of the invention is to provide an inter-coupling control means for a typewriter machine and record card punching machine in which a tabulation operation initiated from the typewriter upon completion of the typing of a word or quantity in a typing field thereof initiates a skipping operation of the card punching machine to the end of a punch control field for the typing field in which the tabulation operation was initiated.

Still another object is to provide an inter-coupling control means for apparatus of the above character in which operation of a tabulation or return key of the typewriter initiates a skipping operation of the card punch machine over a number of record card columns thereof corresponding to the number of letter spaces skipped by the typewriter from the tabulation operation thereof.

A related object of the invention is to provide an inter-coupling control means for the above apparatus in which subsequent operations of the typewriter are inhibited while the carriage is tabulating or returning to prevent card punch operations that otherwise would be established therefrom during such tabulation or return movements of the typewriter carriage.

Another object is to provide an inter-coupling control means for the above apparatus in which subsequent operations of the typewriter are inhibited while the card punch machine is skipping and until the card punch machine has skipped the record card to the end of the control field in which skipping of the card was initiated as from a carriage tabulation or return operation initiated from the typewriter.

Another object is to provide an inter-coupling control means for apparatus of the above character that selectively disables the typewriter while the card punch machine is skipping under the control of a tabulation or return operation initiated from the typewriter depending upon whether or not card punching control of the card punch machine is to be established from the carriage position to which the typewriter carriage has been tabulated or returned from the aforesaid tabulation or return operation of the typewriter.

Another object is to provide inter-coupling control means for apparatus of the above character in which a tabulation or return operation of the typewriter causes an end of word or other special code to be punched in a column of the record card immediately following the last quantity punched therein from a card punch control operation of the typewriter immediately preceding the aforesaid tabulation or return operation thereof.

Still another object is to provide an inter-coupling control means for apparatus of the above character in which punching operation of the punch machine is effected only if a typewriter power cycle is initiated from the depression of a typewriter key.

A related object is to provide improved inter-coupling control means for the above apparatus in which the operation of the record punch machine is disabled upon a double key depression or snap depression of several keys of the typewriter.

A further object of the present invention is to provide an inter-coupling control means including a punch discriminating control which is operable in typewriter carriage positions in which the record punching machine is disabled from the typewriter and which retains the punching machine disabled as the typing continues past subsequent preselected carriage stop positions of the typewriter where punching otherwise would have been enabled had the typing originally commenced in one of said selected carriage stop positions.

Another object is to provide an inter-coupling card punch control means for a typewriter-accounting machine and card punch machine in which the typewriter section of the typewriter-accounting machine is disabled upon operation of the accounting section when controlling numeric card punch operations therefrom.

Still another object is to provide an intercoupling card punch control means for a typewriter-accounting machine and card punch machine in which pulsing of the decimal read-out section of the accounting machine from the card punch machine is prevented during alpha punching control operations of the card punch machine accomplished from the typewriter when the latter is effective to control the card punch machine.

Referring to the drawings.

Figure 16A:
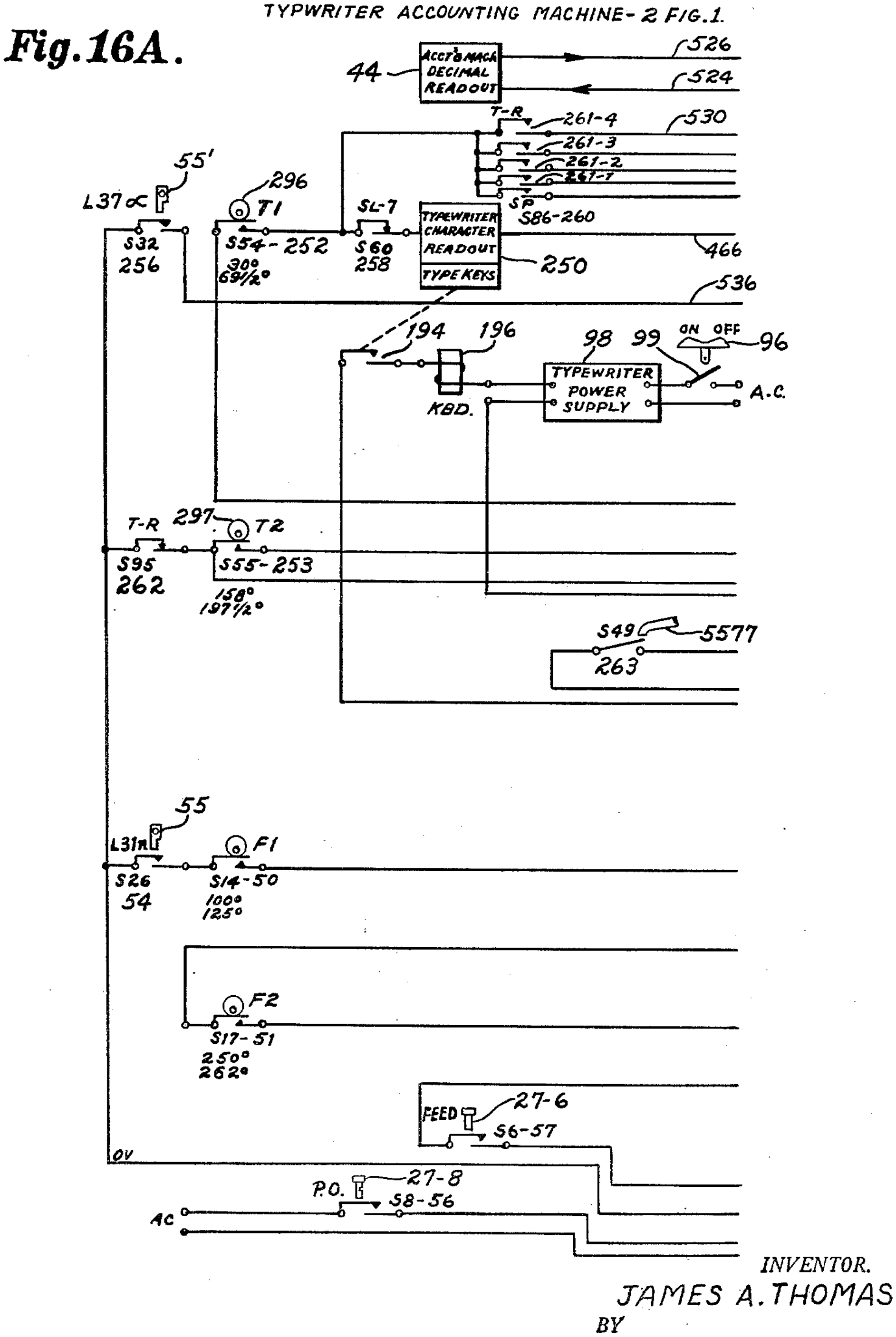
Figure 16:
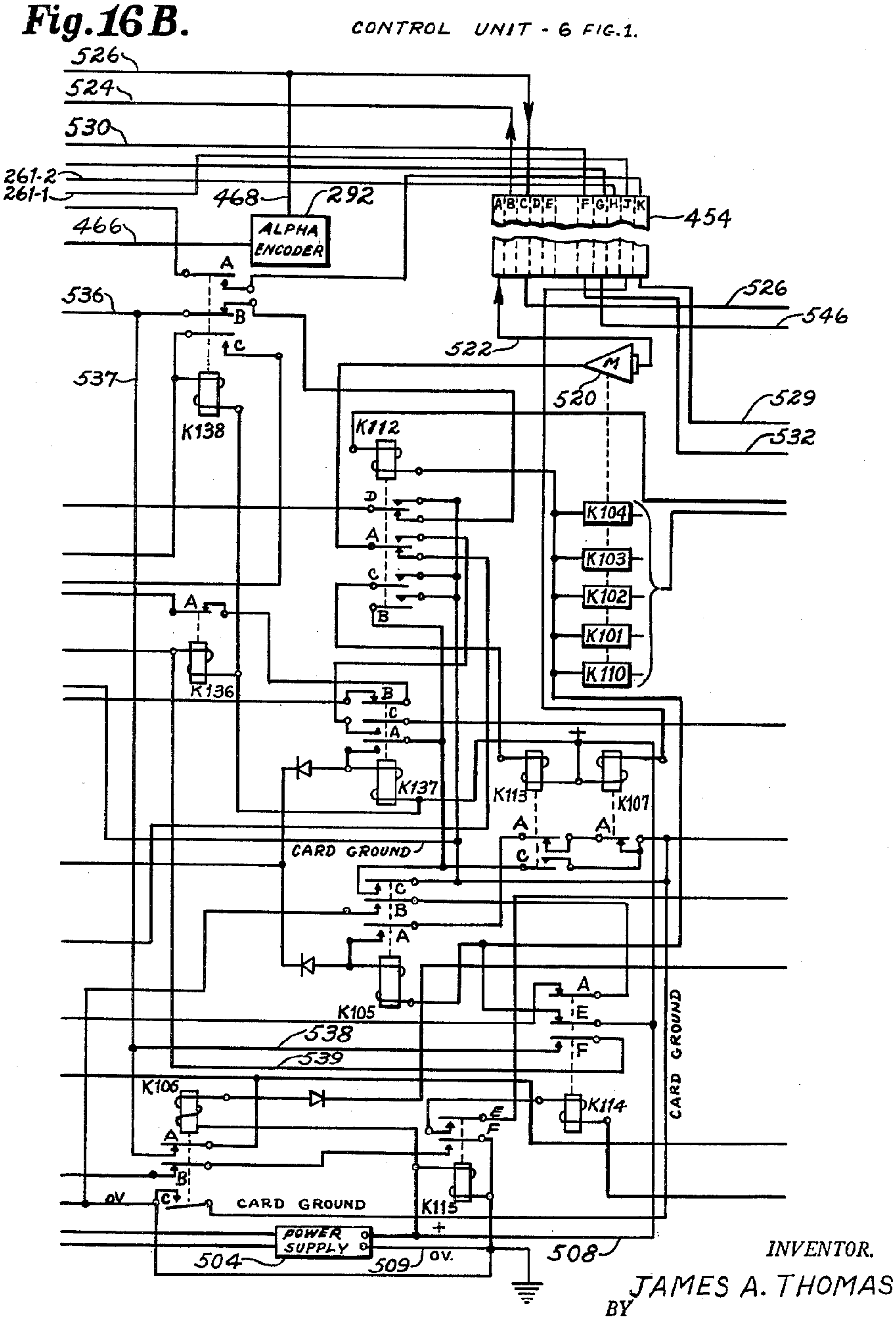
Figures 17A, 17B, 17C, 17D:
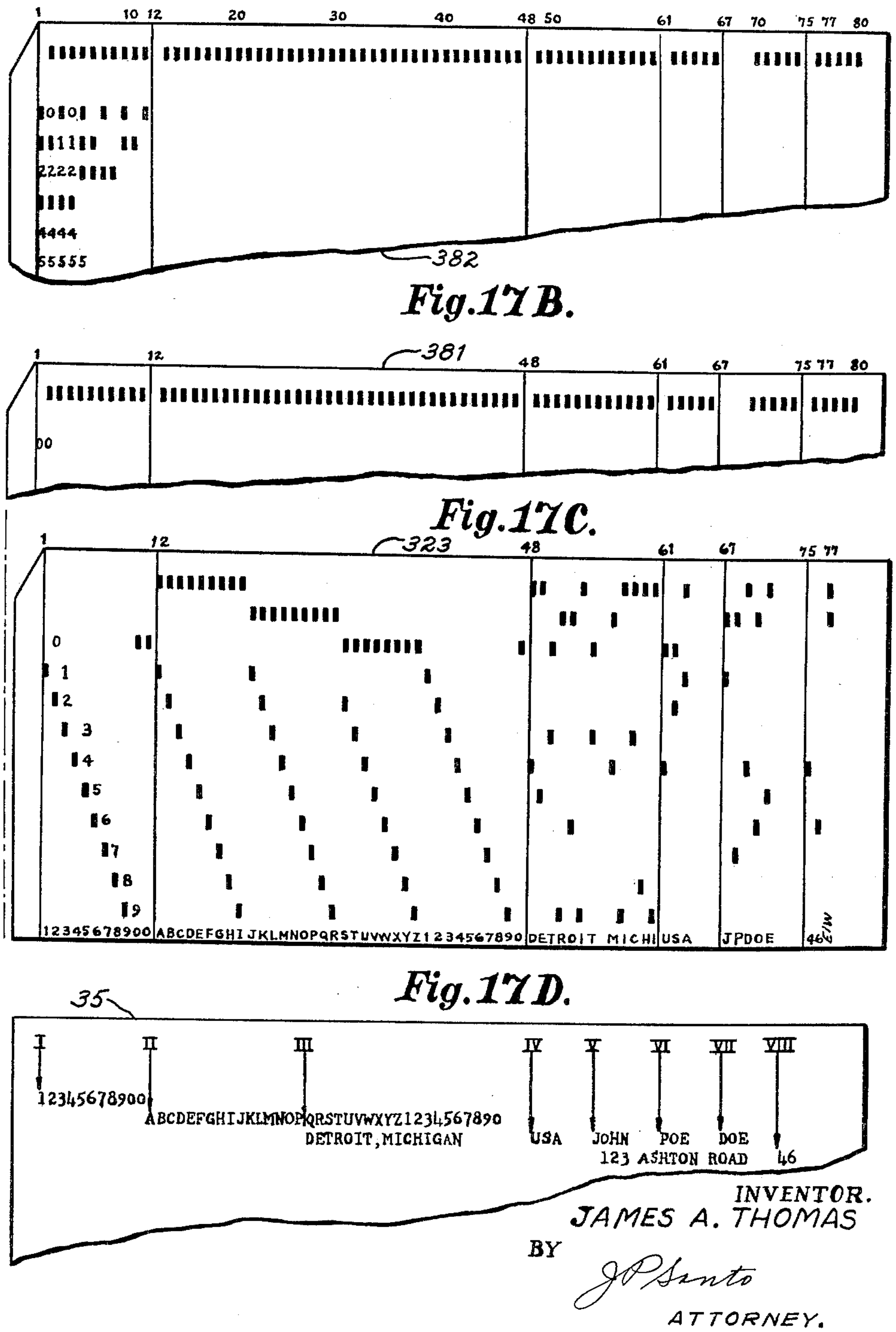

FIGS. 16A, B and C constitute a simplified electrical control schematic of the control unit herein for numerical and alpha punching control of the card punch machine from the typewriter-accounting machine; and FIGS. 17A, B, C and D illustrate the punching of the program cards and detail card for and from various operations of the accounting section and typewriter section of the typewriter-accounting machine.

Referring to the drawings, the accounting apparatus described herein includes a typewriter-accounting machine 2, a card punch machine 4, and a control unit 6 coupled to the typewriter-accounting machine and to the card punch machine over cables 8 and 9, respectively. The typewriter-accounting machine shown in FIGS. 1 through 8 herein is a commercially available business machine described in the aforesaid application S.N. 738,250 for Louis J. Gavasso, hereinafter referred to as the Gavasso application, and includes an accounting machine section 10 and a typewriter section 12 both mounted on a common base portion 14 and having a common carriage 16 movable over spaced columnar stop positions and letter space increments through a common carriage control unit 18.

TYPEWRITER-ACCOUNTING MACHINE

The accounting machine section is basically similar to the accounting or bookkeeping machine described in U.S. Patent 2,629,549 to T. M. Butler and in the embodiment illustrated includes a full keyboard 20 containing eleven vertically extending columns or banks of amount keys 22, three vertical banks of character or symbol keys 23, a vertical row of motoring keys 24, and three vertical rows of functional control keys 26. The machine further includes a gang operated printing section 28 operable from a plurality of actuator or data racks, as 30, differentially positioned from the indexed amount keys or from the machine totalizers 32, shown in the register A, B & C positions, upon initiation of a cycle of operation of the accounting machine. Mounted on the carriage 16 are a vertically spaceable platen 34, upon which a record member 35 may be rolled to receive printed impressions from the printing section 28, and a program tray 36 containing a number of longitudinally and transversely spaced control pins 37 of various depending lengths which cooperate with vertically movable sensor levers 38 in the base portion 14 of the accounting machine to control automatic operations of the machine from a multiplicity of control lanes at various columnar stop positions of the carriage, as described in the Butler patent.

Driving power is supplied to the main cam shaft 39 of the accounting machine from the drive motor 40 in the manner described in the Gavasso application to rotate the cam shaft through the customary one-revolution clutch which is tripped upon initiation of a machine cycle, as from a motoring operation, as described in the Butler patent. Rotation of the main cam shaft moves the actuator racks 30 forwardly where each rack is arrested by a different one of a plurality of stepped sectors 42, one of which is provided for each actuator rack and is differentially positioned in the path thereof in accordance with the value of position of a key depressed in a key bank or column associated with that actuator rack, as described more fully in the Butler patent.

In order to adapt the Butler machine for use with the card punching machine, certain electrical control elements have been added thereto including an electrical, numerical decimal read-out switch assembly 44 for sensing the differential positions of the data racks and converting the differential mechanical positions into electrical switch settings respectively representative thereof; a plurality of machine actuated and carriage position actuated switches initiating operations of the card punch machine in timed relation to the cyclical operation of the accounting machine and from certain carriage positions thereof; and a plurality of manually actuated switches controlling certain functional operations of the card punch machine from the accounting machine, as shown and described in applicant's aforesaid co-pending application S.N. 747,005.

For purposes of the present disclosure, only those electrical control elements, which are necessary to those operations described herein for controlling the card punch machine from the accounting section and which are employed with the typewriter section of the combined machine to control operations of the card punch machine from the typewriter section of the combined machine, are described herein. These elements include the cam actuated timing switches 50 and 51 of FIG. 4a herein, which are identified as S14 and S17 in FIG. 16A and are actuated by timing cams F1 and F2 from 100 to 125 degrees and from 250 to 262 degrees, respectively, during the cycle of rotation of the main cam shaft 39 of the accounting machine; the stack of lane switches 53, which includes a numerical punch indication switch 54 identified as S32 in FIG. 16A and is selectively actuated at pre-determined columnar stop positions of the machine carriage by suitable switch actuators such as the depending actuator lugs 55 carried by the machine carriage, a separate actuator lug being provided for each lane switch including a lug in lane 37 for actuating switch S32 in those carriage positions from which numerical punching control of the card punch machine is desired from the accounting section of the typewriter-accounting machine; and the switches 56 and 57, which are identified as S8 and S6 in FIG. 16A and are actuated by the punch On Key 27—8 and by the Feed Key 27—6 of a special vertical row 27 of manually actuated functional control keys added to the right hand side of the accounting machine keyboard 20 of FIG. 3, as described in applicant's co-pending application S.N. 747,005. The latter switches are shown in outline form in FIG. 4a herein with their actuators and some of the switches actuated by other ones of the keys of this row. The aforementioned decimal read-out assembly 44 may be of the rotary read-out variety illustrated in U.S. patent applications S.N. 525,343 filed July 29, 1955, now Patent No. 2,955,755 and S.N. 739,567 filed June 3, 1958, now Patent No. 2,955,758 and of common ownership herewith, but could also be of the form illustrated in applicant's aforesaid applications.

The electric typewriter section 12 of the combined machine 2 includes a typewriter keyboard 60 located forwardly of and slightly below the accounting machine keyboard 20, a plurality of transversely extending code or permutation slides 62 coupled with a like plurality of longitudinally extending actuator slides 64, a code head 66, a writer section 68, a typewriter cam shaft assembly 70, a typewriter drive trip solenoid 72, an electro-magnetic hysteresis clutch 76 and the aforesaid carriage control unit 18 common to the accounting and typewriter sections. The hysteresis clutch and carriage control unit control various movements of the common carriage for tabulation, return and letter space escapement operations of the accounting machine and typewriter, as explained in the above-mentioned Gavasso application to which reference should be made for a more complete understanding of the structure and operation of the typewriter sections mentioned herein.

Figure 3:
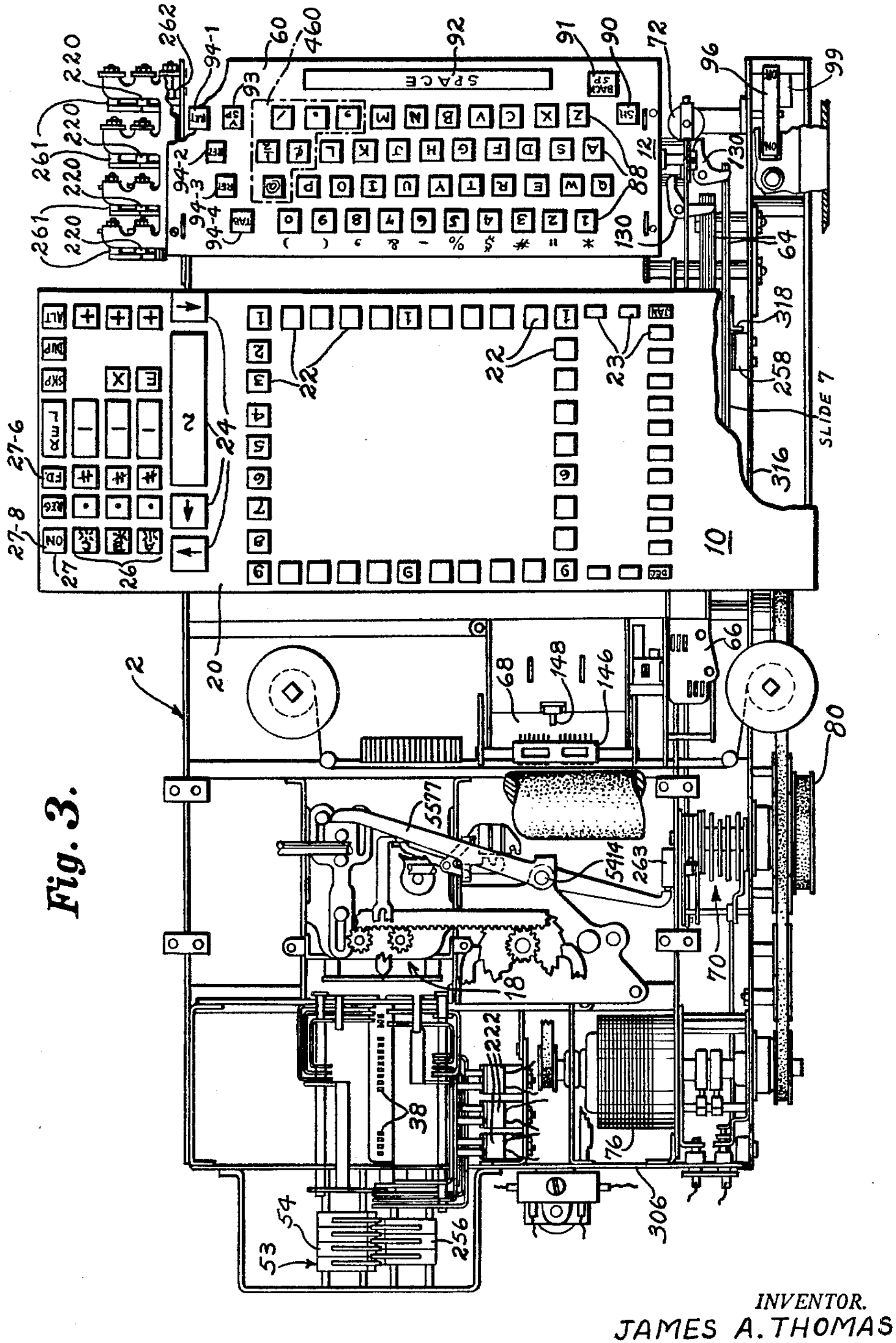
FIG. 3 is a top plan view of the typewriter-accounting machine with the carriage removed illustrating the keyboards of the typewriter and accounting machine sections and some of the electrical components added to the machine for the control system of the present invention.

Power to the accounting and typewriter sections of the combined typewriter-accounting machine is furnished from the constantly running drive motor 40 which is belted to a main drive pulley 80 on the main drive shaft 82 from which power is supplied to the typewriter cam shaft assembly 70, an auxiliary drive shaft 84 associated with the main cam shaft 39 of the accounting machine as shown in FIG. 3 of the Gavasso patent, and to the hysteresis clutch 76 and the carriage drive unit 18.

The typewriter keyboard 60 includes forty-two character typing keys 88 distributed in the standard four horizontal row arrangement of a conventional typewriter, a shift key 90, a back space key 91, a space bar 92, a vertical space key 93, a group of four tab and return keys 94 located on the right side of the keyboard, and an On-Off key 96 for actuating a switch 99 that controls application of electrical power to a separate power supply 98 from which power is supplied to some of the electrical control elements of the typewriter. The upper row of character keys contains the numerals 1 through 9 and 0, while the twenty-six alphabetical letters and certain other typing symbols are provided on the lower three horizontally extending rows of keys. Indexing the shift key 90 permits printing of forty-two additional symbols from the upper shift position of these same character typing keys.

Figure 5:
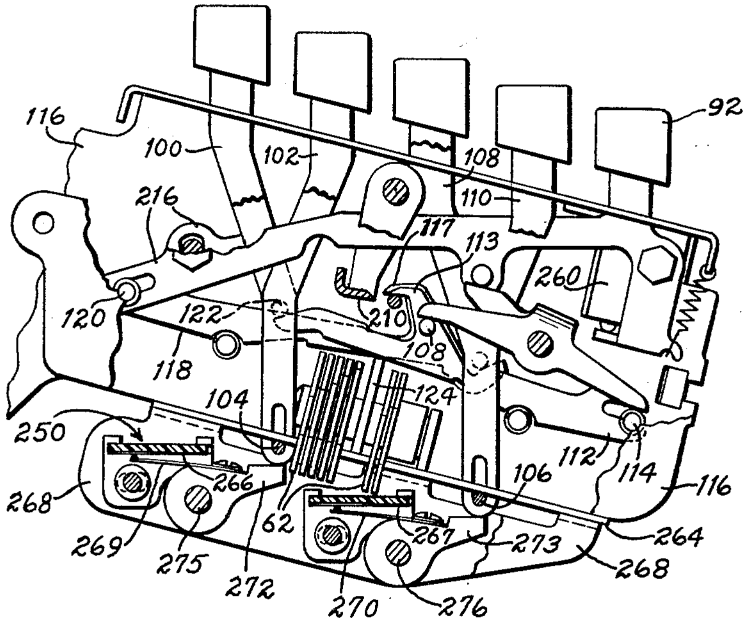
FIG. 5 is a left side elevation view with parts broken away of the typewriter keyboard mechanism of FIG. 3.
Figure 6:
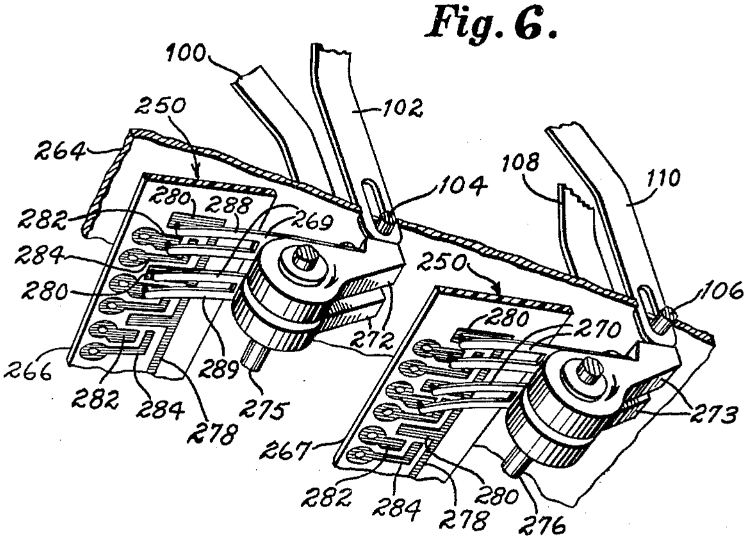
FIG. 6 is a perspective view of the typewriter electrical character readout apparatus located below the typewriter keyboard.

The key stems 100, 102 of the two upper rows or the fourth and third rows of keys are bent oppositely as shown in FIGS. 5 and 6 and are guided by a fixed, transversely extending rod 104 received in the slotted lower ends of the key stems. A similar fixed rod 106 spaced forwardly from rod 104 is provided for guiding the key stems 108, 110 of the two lower rows or the second and first rows of keys. Associated with the key stems of each key of the fourth and third rows, including the tab key 94—4 and return key 94—3, is a key lever as 112 which has a hook projection 113 thereon and is pivotally mounted at its right end on a transversely extending, grooved rod 114, fixed in spaced side plates 116 of the typewriter keyboard. A similar, oppositely extending key lever as 118 having a hook 117 is provided for each of the keys of the second and first rows, including the return keys 94—2 and 94—1, and is pivotally mounted on a grooved rod 120 similar to and spaced rearwardly of rod 114. Each key stem includes a stud, as 122, which, upon depression of the key, rocks the associated key lever 112 or 118 into the path of the keyboard code slides 62 and into the slots of a stationary comb-like inter-lock assembly 124 best shown in FIG. 7. As explained in the Gavasso application, the interlock assembly is so constructed as to receive only one key lever at a time and blocks the downward movement of any other key lever should more than one typewriter key be depressed.

Figure 8:
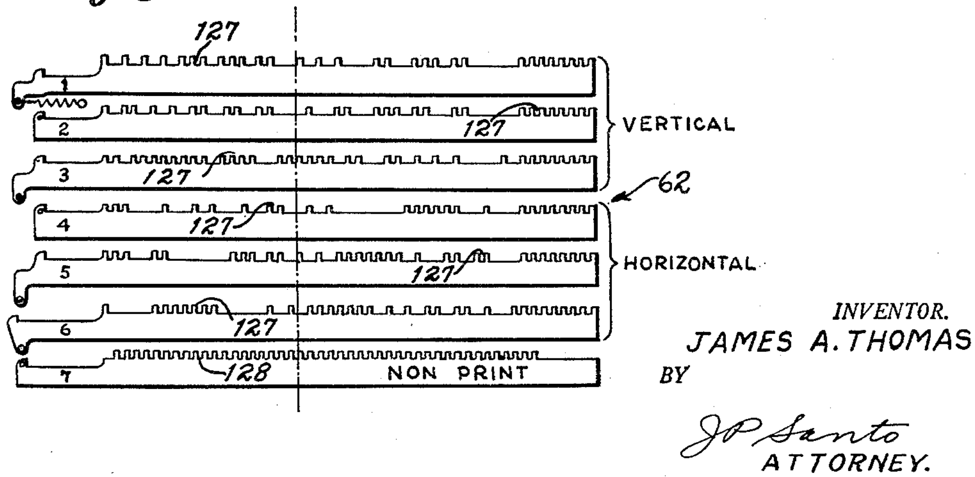
FIG. 8 is a diagrammatic view of the code actuating slides employed in the typewriter section of the typewriter-accounting machine.

The code slides 62 provide a means of transferring the index from a typewriter key into a position control for subsequent locating and printing of a selected character through the code head 66 and writer section 68 of the typewriter and are illustrated diagrammatically in FIG. 8 herein as an arrangement of seven slides numbered 1 through 7 starting from the rear of the keyboard. As explained in the Gavasso application, slides 1, 2 and 3 control the vertical movement of the writer box through the code head and slides 4, 5 and 6, the horizontal movement. Each slide is held in its normal position, spring biased to the right, to provide alignment of its irregularly spaced cut-outs 127 with the key levers 112, 118. Code slide number 7 is used to sense non-print operations and includes regularly spaced cut-outs 128 which are in alignment with all of the key levers which block its movement inactivating the slide when any character key is depressed. Non-printing or writing operations, such as space, back space and tab or return, permit movement of slide 7, which is active under these conditions.

Through an arrangement of pivotally mounted bell cranks, as 130 shown in FIG. 3, the seven transversely extending code slides are coupled to the like number of longitudinally extending actuator slides 64, which are spring biased rearwardly as shown at 134. The actuator slides 64 normally are held forwardly by a cam follower bail, a part of which is shown at 136 in FIG. 2 herein. The bail and follower mechanism are shown more fully as elements 4781, 4785 and 4786 in FIG. 15 of the Gavasso application and are actuated from the typewriter cam shaft assembly upon initiation of a power cycle of the typewriter at which time the actuator slides may move rearwardly to pull leftwardly those code slides 62 which have not been blocked by the lowered key lever of an indexed typewriter key.

The selectively blocked code slides 62 thus prevent rearward movement of certain ones of the longitudinally extending actuator slides 64, each of which has an upwardly extending rear projection 138 thereon. Upon rearward movement of an active code actuator slide, the projection engages and rocks a bell crank 140 to lower a link 142 and a code driving link 144 of the code head 66. The type box 146 of the typewriter section is horizontally and vertically positioned through the coding head to locate a type element corresponding to the indexed character key in the path of a printing hammer 148 that is subsequently actuated during the typewriter power cycle, all as described in the aforesaid Gavasso application to which reference should be made for a more complete description of the coding head and writer sections of the typewriter.

Figure 7:
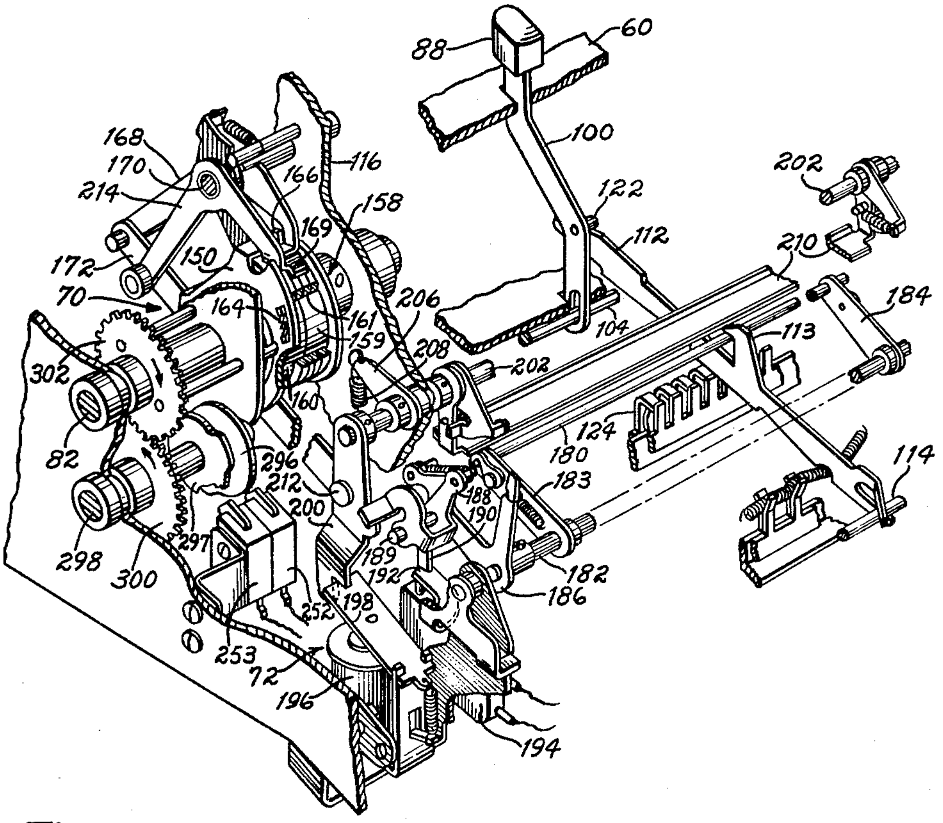
FIG. 7 is a perspective view with parts broken away illustrating the typewriter drive-trip mechanism.

The driving power and the timing control of all of the typing functions of the typewriter are provided through the typewriter cam shaft assembly 70, which includes six spaced cams, one of which is shown at 150 in FIG. 7 herein, and a one revolution spring clutch assembly 158. The clutch comprises a pair of relatively rotatable, disengageable drum sections 159, 160 and a coil spring 161 coiled around the drum sections. The right drum section 159 of the clutch drum is pinned to the main drive shaft 82 mounting the main drive pulley 80 and is driven continuously from the drive motor 40 located below the base portion of the combined machines. The left end 160 of the clutch drum serves as a carrier for the typewriter cams, which are pinned thereto, and is freely mounted on the shaft 82 for relative rotatable movement thereon.

The left end of the coiled clutch spring 161 is bent axially outwardly and is received in a serrated tooth notch 164 in cam 150 immediately adjacent the left drum section. The right end 166 of the spring is bent radially outwardly and is held by the tab end 169 of a trip bell crank 168, which is journaled in a fixed rod 170 and is pivotally coupled at its other end to a drive trip link 172. The drive trip link 172 is permitted to move rapidly forwardly upon energization of the coil of the aforementioned drive trip solenoid assembly 72 on depression of a typewriter key and swings the tabbed end 169 of the trip bell crank 168 out of the path of the right end 166 of the normally expanded coil spring. The clutch spring then contracts, gripping the two drum sections 159, 160 together to drive the typewriter camshaft assembly. Disengagement of the spring clutch occurs near the end of the typewriter cam shaft cycle when the radially projecting end of the spring contacts the trip bell crank 168, which has been lowered into the path of the spring, and the momentum of the cam assembly expands the coil spring, freeing it from the constantly rotating right drum section 159.

As described in the Gavasso application, the typewriter cam shaft assembly 70 is tripped through the drive trip solenoid 72 from the depression of any typewriter key except the shift key 90 and the vertical space key 93. Depression of any one of the keys, except the shift and vertical space keys, causes the hook projection 113 or 117 of the key lever 112 or 118 associated with the indexed key to engage and rock a bail 180. Bail 180 is coupled to a trip shaft 182 through a pair of spaced levers 183 and 184 and a bell crank 186, which is secured to the trip shaft. The counter-clockwise movement of the bell crank 186 lowers a trip pawl 188, which is pivotally coupled thereto at 189 and has a downwardly projecting tab 190 thereon. Lowering of the trip pawl swings tab 190 into engagement with one end of a pivotable switch actuating lever 192 constituting an actuator arm for a micro-switch 194 which closes an electrical energizing circuit to the coil 196 of the typewriter drive trip solenoid 72.

Energization of the solenoid coil attracts clapper 198 to release the notched lower end of a trip lever 200, the upper end of which is secured fast to a shaft 202 journaled in the side plates 116 of the typewriter keyboard assembly. Secured to the shaft 202 is a lever 206 having one end of a spring 208 thereon, the other end of which spring is fixed to a stud projecting laterally from the left side plate of the keyboard assembly. Releasing the trip lever 200 allows the normally restrained spring 208 to rotate the lever 206 and shaft 202 counter-clockwise to swing a bail 210 secured to shaft 202 over the hook projection 113 or 119 of the lowered key lever 112 or 118 in order to hold the indexed key lever depressed. Forward movement of the trip lever 200 rocks the trip pawl 188 counter-clockwise clear of the switch actuator 192 to permit the contacts of switch 194 to open, thereby de-energizing the coil 196 of the drive trip solenoid.

The drive trip link 172 is pivotally coupled to the trip lever 200 at 212 and is pulled forwardly with the forward movement of the trip lever 200 to rock the aforesaid trip bell crank 168 in a counter-clockwise direction and clear the vertical projection 166 of the normally expanded clutch spring 161. The spring then contracts, gripping the constantly rotating right drum section 159 with the normally disengaged left drum section 160 to drive the cam assembly from the main drive pulley 80 for a cycle of revolution of the clutch. At about 200 degrees of the typewriter cam shaft rotation, the high point of cam 150 rocks the crank 214, which is rigidly secured to the trip bell crank 168, to lower the tab end 169 of crank 168 into the path of the radial spring projection for subsequent disengagement of the clutch and retracts the drive trip link 172 to restore bail 210, thereby releasing the depressed key and its associated lever following which the trip pawl 188 is reset over the switch actuating lever 192.

The space bar 92 is pivotably coupled to the rear fixed rod 120 through a spaced pair of upwardly spring biased levers shown at 216 in FIG. 5, and, when depressed, causes a rearwardly pivoted key lever, similar to key lever 112, to be lowered into the cut-outs of the code slides 62 and to rock bail 180. This action trips the typewriter drive and initiates a letter space escapement of the carriage through code slide 7 which is active for a space bar operation.

The tab and return carriage control keys 94—1 through 94—4 permit indexing of the carriage movement to reposition the carriage after typing a posting description or like information and provide for tripping the typewriter drive by indexing of code slide 7, slides 1 through 6 being blocked as in the aforementioned space bar operation. Through an arrangement of bails and notched slides, illustrated in FIG. 44 of the Gavasso application, the carriage control keys actuate a combination of two or more switches as 220 in FIGS. 3 and 4 herein to close electrical circuits to a plurality of solenoids 222, which control selective tab and return movements of the carriage, as described in the aforementioned application.

In order to adapt the typewriter machine for use with the card punch machine, certain electrical control elements have been added thereto as illustrated in FIGS. 2, 3, 5, 6 and 7 herein. These elements include an electrical character read-out section 250, a pair of timing switches 252 and 253 operated from the typewriter cam shaft assembly 70, a carriage position actuated typewriter punch indication switch 256 added to the aforementioned lane switch assembly 53, a control switch 258 operated whenever actuated slide 7 is activated, a control switch 260 operated upon depression of the space bar 92, a group of control switches 261—1 through 4 similar to the switches 220 and each actuated by a different one of the carriage tabulation and return control keys 94—1 through 4, a control switch 262 similar to the switches 220 and 261 and operated on indexing of any of the carriage control keys 94—1 through 94—4, and a typewriter carriage tabulation sensing switch 263 operated during tabulation and return movement of the typewriter carriage.

The typewriter character read-out section 250 is located below the bottom plate 264 of the typewriter keyboard assembly and comprises a spaced pair of horizontally positioned, transversely extending printed circuit boards 266 and 267 that are fixedly mounted between a pair of laterally spaced brackets 268 depending from the bottom plate 264 of the typewriter keyboard assembly. Associated with each board 266 and 267 is a plurality of transversely spaced leaf spring switch blades 269 and 270 carried by a like plurality of transversely spaced nylon block levers 272 and 273 that are individually pivotably mounted on a different one of a rearwardly and forwardly spaced pair of transversely extending fixed rods 275 and 276.

Each printed circuit board includes a transversely extending common bus conductor 278 having a plurality of laterally spaced, rearwardly extending conductive arm portions 280 integral with and normal to the bus conductor. Located between adjacent arm portions 280 of a bus conductor are a short pad terminal 282 and an L-shaped terminal 284, which, together with the arm portion 280 to the right thereof and an aligned one of the switch blades of the group of switch blades 269 or 270, as viewed from the underside of the board, constitutes an electrical S.P.D.T. switch, one of which is provided for each character key of the typewriter read-out section. The free end of each conductive switch spring is bifurcated and carries a pair of electrical contacts on the respective ends 288, 289 thereof that engage a printed circuit board associated therewith. The switch springs are tensioned so that their contacts at all times are urged against the bottom surface of the printed circuit board. With the depression of a key, the rounded end of the key stem rocks a corresponding one of the switch levers 272 or 273 and places the resilient switch blade, secured to the upper flat surface of the nylon switch lever, under additional spring tension and urges the contacts upwardly with additional force against the board, thus avoiding the possibility of contact bounce. The angular movement of the associated nylon block lever will cause the bifurcated ends of the resilient blade to move forwardly with a wiping action, with arm 289 moving off of terminal 282 and onto terminal 284 to complete an electrical circuit between arm 280 of bus conductor 278 and the normally open terminal 284 through the forwardly actuated switch blade. The respective terminal pads 284 of each of the printed circuit boards are wired through an encoder 292 to the interposer or punch magnets of the punching machine to punch the appropriate code in the record medium therein when a key activated one of the character read-out switches of the typewriter section is pulsed through one of the timing switches 252, as later described.

The timing switches 252, 253, shown in FIG. 7 are located below the typewriter cam shaft assembly 70 and are actuated by respective cams 296, 297 shown as being fixed to a shaft 298 having a small gear 300 thereon. The latter gear is driven from a gear 302 that is freely mounted on the main drive shaft 82 and is shown secured with the aforementioned typewriter timing cams to the driven left end of the typewriter drive trip clutch 160. Cam 296, identified in FIG. 16A as T1, actuates switch 252 or S54 to close a set of normally open contacts thereof from 30 to 69½ degrees of the typewriter cam shaft cycle, while cam 297 or T2 actuates switch 253, labelled S55 in FIG. 16A, to close a similar set of contacts from 158 to 197½ degrees of the typewriter cycle.

The carriage position actuated switch 256 is mounted on the rear plate 306 of the base portion of the typewriter-accounting machine together with the aforementioned carriage position actuated lane switches 53 provided for the accounting section of the typewriter-accounting machine and is located in lane 37 of the extended control lanes of this machine for actuation by a suitable actuator such as a control pin or lug 55′ in those carriage stop positions of the program tray at which alpha punching control of the card punch machine is desired from the typewriter section 12 of the typewriter-accounting machine 2. For purposes of character punching from the typewriter, only lane switch 256, identified as S32 in FIG. 16A herein, need be considered, it being understood that a switch actuator is provided therefor in the letter space position at the beginning of each typing field of the machine carriage at which a typing operation initiated from the typewriter is to effect a corresponding control or character punching operation of the punching machine.

Figure 2:
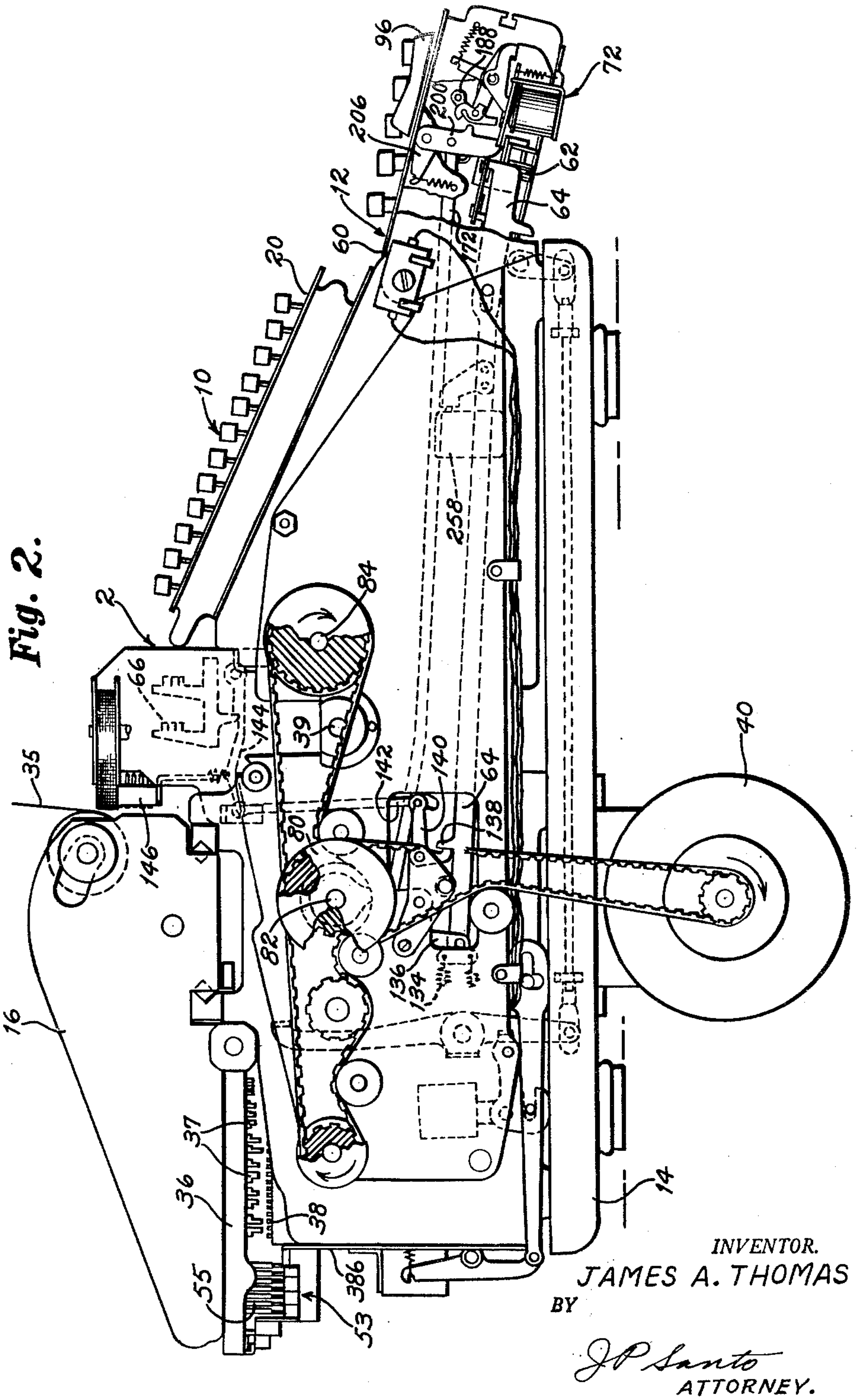
FIG. 2 is a left side elevation view with parts broken away of the typewriter-accounting machine herein.

The control switch 258, labelled S60 in the schematic control wiring diagram of FIG. 16A herein, is operated whenever the aforementioned code slide 7 is activated and is shown in FIG. 2 mounted on the inner side of the left side frame 316 of the machine. The longitudinally extending actuator slide associated with keyboard code slide 7 is provided with an upwardly extending blank or actuator arm 318 for actuating switch 258 upon rearward movement of the slide from a non-printing typing operation, as space, tab or return, or from a multiple or snap key depression of several keys as previously mentioned.

Figures 4, 4A:
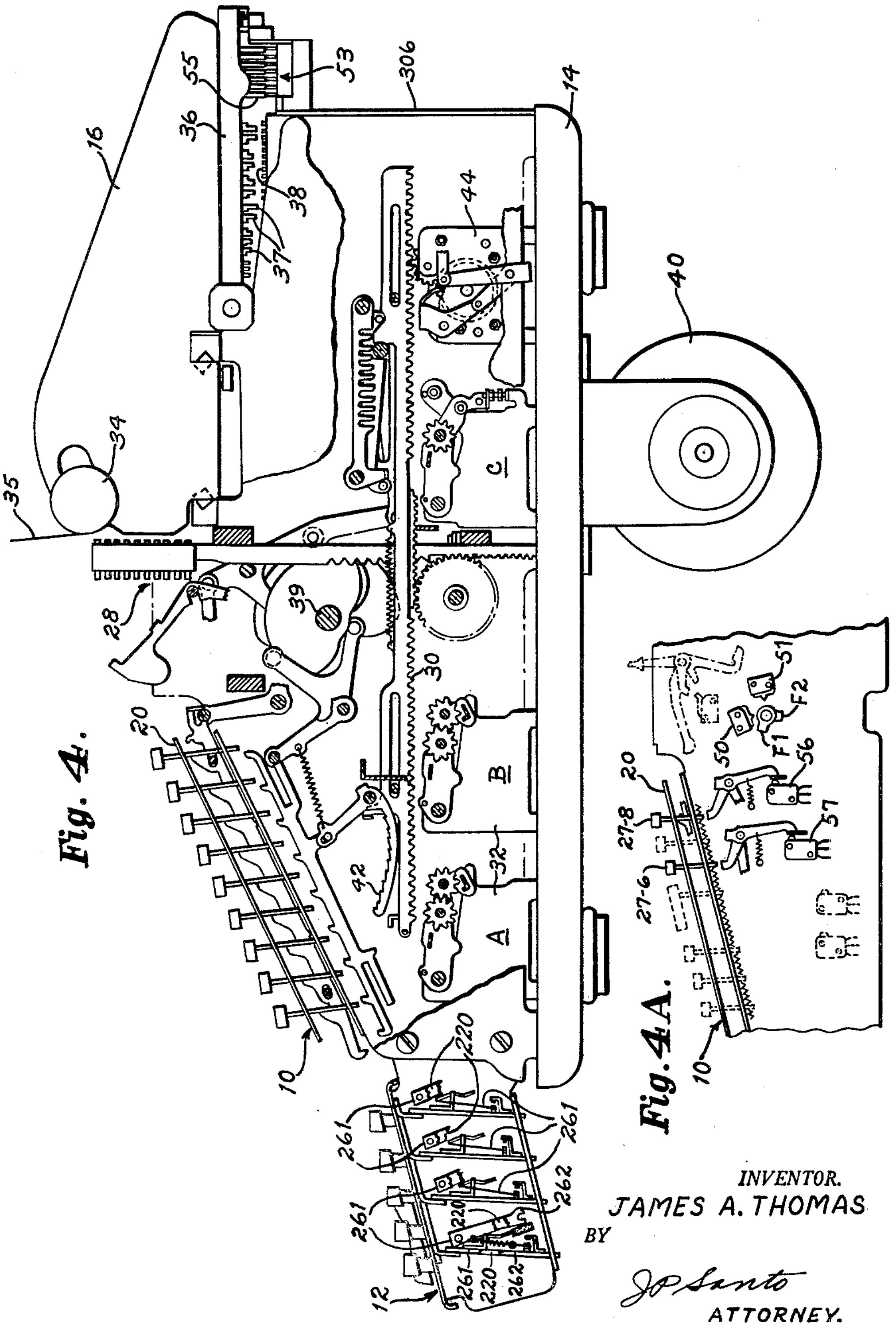
FIG. 4 is a right side elevation view of the typewriter-accounting machine illustrating some of the electrical components added thereto for purposes of the present invention.
FIG. 4a is a diagrammatic view illustrating some of the other electrical components which have been added to the accounting machine section of the typewriter-accounting machine for timing purposes and effecting certain functional operations of the card punch machine therefrom.

Control switch 260, shown in FIG. 5 and labelled S49 in FIG. 16A, is located under the typewriter keyboard and is momentarily actuated whenever the space bar 92 is depressed for initiating a corresponding space or skip operation of the punching machine as later described. Control switch 262 (S95), shown in FIGS. 3 and 4, is actuated whenever any one of the tab or return carriage control keys 94—1 through 94—4 of the typewriter is depressed for a control function later to be described. The control switches 261—1 through 4 are actuated from corresponding individual ones of the keys 94—1 through 4, respectively, for control functions later described.

The control switch 263 is shown in FIG. 3 adapted for operation from a lever element 5577 bearing the same identification as the corresponding lever element in FIGS. 37 and 40 of the aforementioned Gavasso application in which the lever element is moved about pivot 5414 while the typewriter carriage is moving in a tabulating or return direction from a tabulating or return operation or whenever the carriage is open. The switch 263 is identified as switch S49 in the schematic control wiring diagram of FIG. 16A herein and will be understood to be actuated whenever the typewriter carriage is in motion from a tabulating or return operation control operation thereof and also when the carriage is open.

CARD PUNCH MACHINE

The card punch unit 4 employed in the accounting apparatus of the present invention may be a commercially available IBM key punch machine such as is described in U.S. Patents 2,647,581 and 2,753,789 to E. W. Gardinor et al. and is employed with record cards of the well-known IBM variety in having twelve horizontal rows of punch designation receiving positions and eighty vertical columns. Each column may receive a single hole or a combination of holes to be punched therein to designate a number or an alphabetical character or symbol, and the card can be divided into a plurality of separate data designation fields, each containing one or more columns for receiving one or more digit symbols or characters of the data to be punched.

Figure 1:
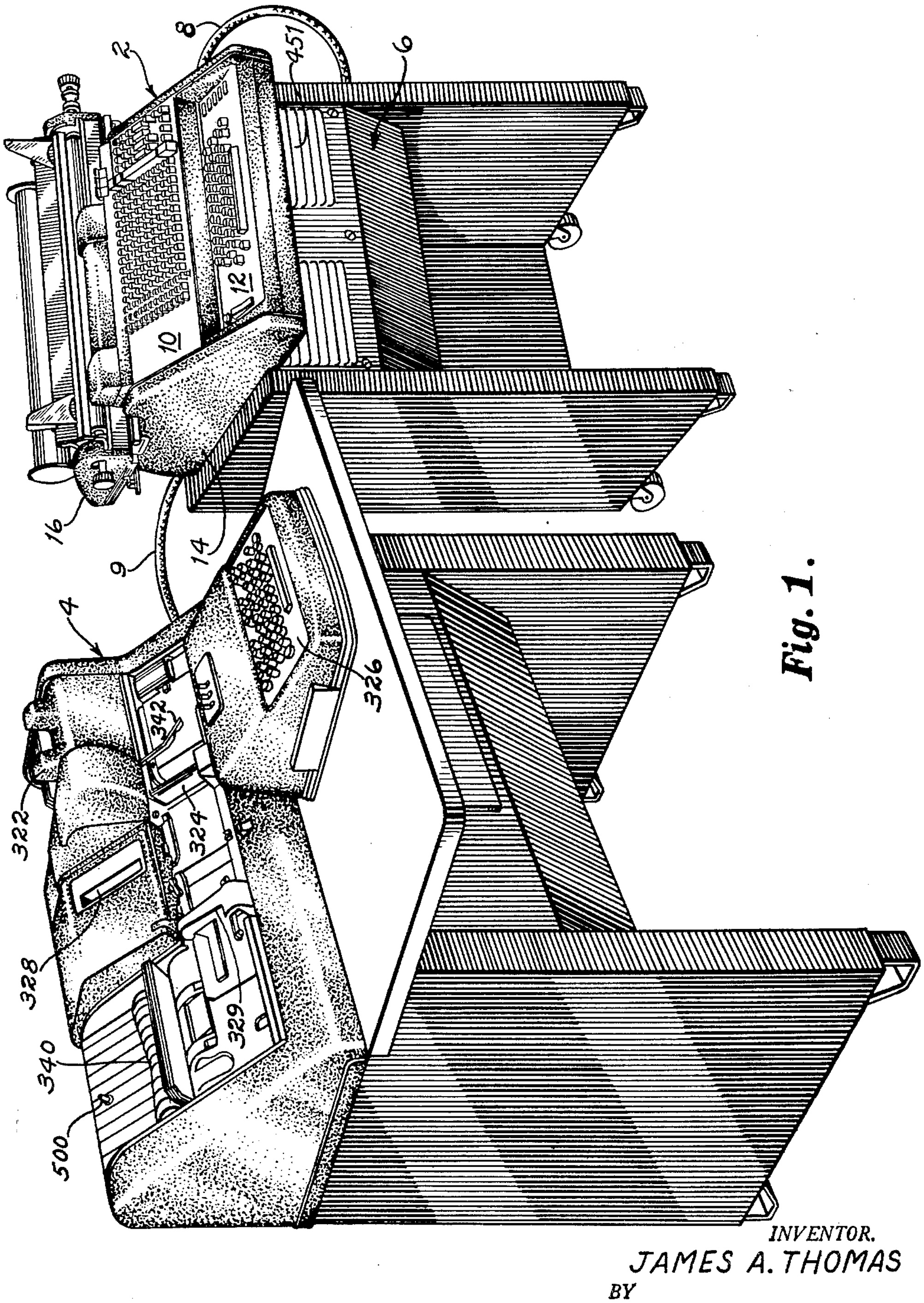
FIG. 1 is a perspective view of a typewriter-accounting machine coupled to a card punch machine through the card punch control unit of the present invention.
Figure 9:
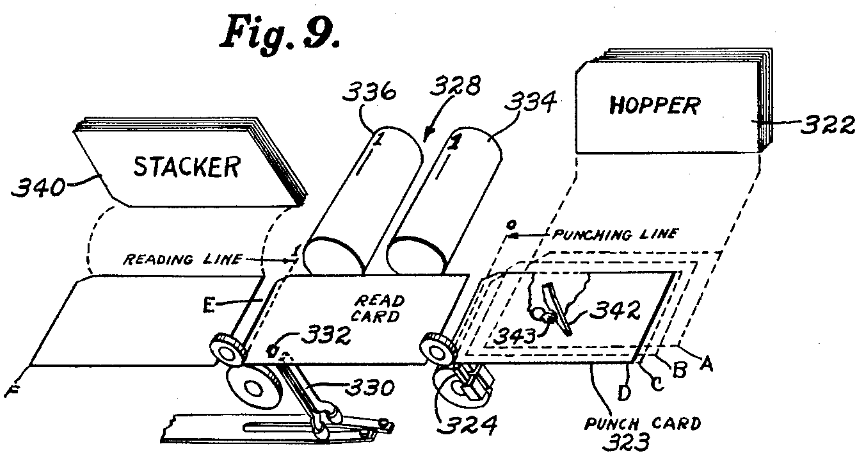
FIG. 9 is a diagrammatic view illustrating the path of a record card in the card punch machine.

With reference to FIGS. 1 and 9, the card punch machine includes in general a card hopper 322 from which a record card 323 is adapted to be released and fed in succession past a punching station, which includes punching mechanism 324 for punching a card column by column under the control of a keyboard 326 and a program unit 328, and is then advanced individually column by column past a reading station. As a card is being punched, the card just previously completed, called the read card, is being fed column by column past the reading station, which includes mechanism 330 that senses the absence or presence of a hole or holes such as 332 punched in a column therein to enable duplication of any card column or group of punched columns from the card at the reading station into the subsequent card at the punching station. Such duplication, in the normal use of the machine, is controlled by the regular program drum 334 or by an auxiliary duplicating drum 336, both included in the program unit, or from the key punch machine keyboard from which selective punching of the card and functional controls of the machine are available, the program drums serving to bring about certain alternate automatic operations and other operations of the card punch machine incident to record card punching. After the read card has been advanced past the read station, it is automatically ejected and stacked in its original sequence in a card stacker 340 at the upper left of the machine.

The mechanical and electrical elements for effecting and controlling the various functions of the machine, including feeding, alignment, registration, punching, releasing, reading, ejecting, and stacking of the cards, together with the manner of programming the machine, are described in the aforementioned Gardinor patents to which reference should be made for a more complete understanding of the construction and operation of this machine.

The card path through the machine is illustrated in the diagrammatic view of FIG. 9 herein. On the first card feed cycle, initiated from the keypunch keyboard, a card is fed from the hopper at 322 and advanced to a position A and then shifted to a position B, referred to as the preregistration position. In moving to the position A, the card enters between a spring-urged lever 342 and a contact button 343 that operate a card lever switch CLS included in the card feed control circuit of the card punch machine. A second card feed cycle is then initiated to shift the first card to the left and align it at position C, from which it is then advanced during the same feed cycle to the full line position D in preparation for punching with its first card column located one step or column to the right of the punching line, and a second card is advanced from the hopper to position A and then shifted under the first card to position B where it remains until the third card feed cycle.

The first card is then advanced under control of the keyboard or program unit from the D position, column by column, past the punching line, until column 80 has traversed thereby when a third card feed cycle is automatically initiated to advance the first card to a position E, where its first column is positioned at the reading line. During this third cycle, the second card is advanced from position B to position D and a third card is released from the hopper and advanced from position A to position B. From here on, the first and second cards are moved concurrently with the first card passing the reading line as the second card is advanced past the punching line under the control of the program unit or the keyboard until the 80th column of the second card has completely traversed the punching line.

Thereupon, a fourth card feed cycle is automatically initiated, during which the first card is advanced to position F from where it is shifted at right angles and delivered into the stacker 340, the second card is advanced to reading position E, the third card to punch position D, and a fourth card is dropped from the hopper and advanced to preregistration position B where it remains until the next card feed cycle.

Figure 10:
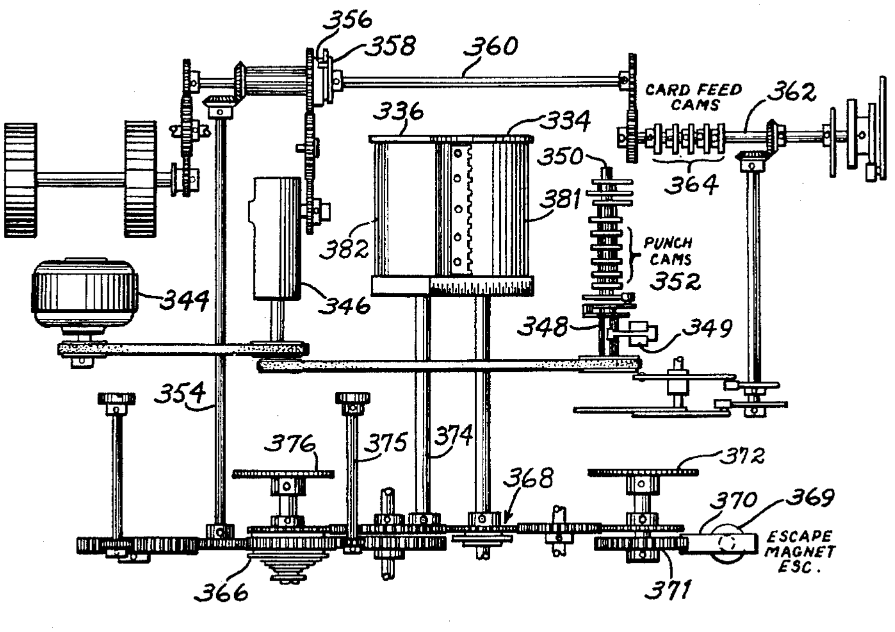
FIG. 10 is a general drive schematic of the card punch machine.

FIG. 10 is a generalized drive schematic showing the relationship of various mechanical components of the machine and includes, in the main, a continuously running drive motor 344, which drives a reduction gear unit 346 and a part of an electro-magnetically operated, one-revolution punch clutch 348 described in the Gardinor patents. Energization of the punch clutch operating magnet 349 causes the drive to be applied to a punch cam shaft 350 on which is mounted a plurality of spaced timing cams 352, referred to as the punch cams P1 through P5. Associated with each of the cams is a separate set of switch contacts designated P–1 to P–5, one set P–3 of which is illustrated in FIG. 11 herein.

The reduction gear unit 346 is geared to a transverse drive shaft 354 and to a card feed clutch ratchet 356, which is cooperatively associated with an electro-magnetically operated one-revolution card feed clutch 358 shown together with its operating magnet in FIG. 6 of the Gardinor patents. Energization of the card feed clutch magnet through depression of a card feed key or the card register key of the keyboard of the card punch machine or through a set of cam actuated switch contacts PC2 provided on the regular program drum 334 of FIG. 13 herein engages the card feed clutch with a card feed shaft 360 which is geared to a card feed cam shaft 362 having a number of electrical switch actuating card feed cams 364 mounted thereon, one of the cam actuated switches CF3 of which is shown diagrammatically in FIG. 16C herein. The transverse drive shaft 354 also applies power through a frictional drive disc clutch 366 to an escapement gear train 368, which is under the control of an escape magnet 369, labelled "ESC.," to operate in synchronism a punch feed roll 372, the shafts 374 and 375 of the regular program drum 334 and the auxiliary storage drum 336, and a read feed roll 376 when the escape magnet is energized.

Figures 11, 12, 13:
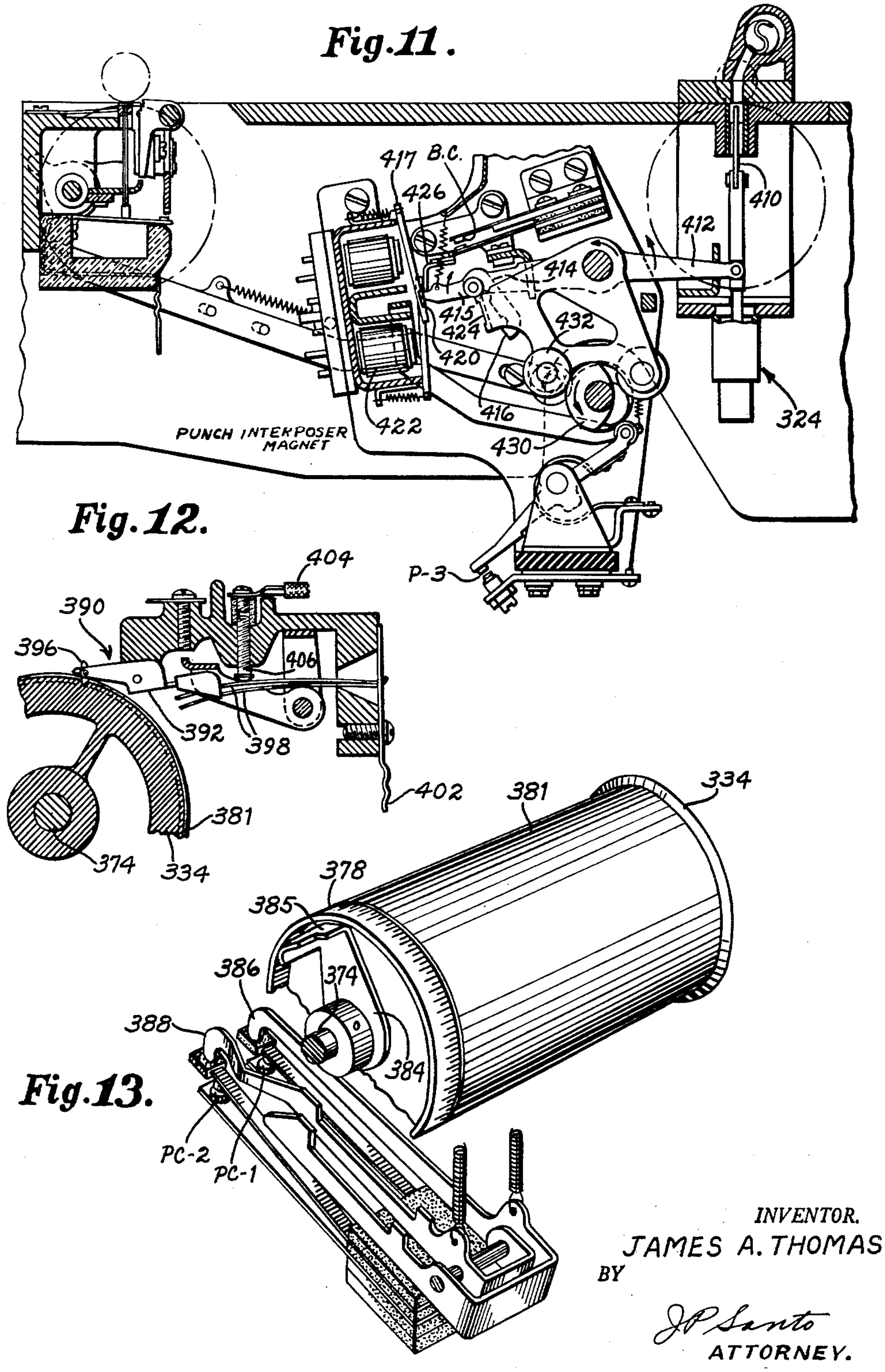
FIG. 11 is a longitudinal section elevation view through a part of the card bed of the card punch machine showing some of the mechanical and electrical components of the card punching machine.
FIG. 12 is a sectional view illustrating a star wheel switch actuating mechanism employed with a program drum in the card punch machine.
FIG. 13 is a perspective view of the regular program drum employed in the card punch machine.

With reference to FIGS. 12 and 13, a program column indicator disc 378 is fixedly mounted on the shaft 374 of the regular program drum 334, which is releasably mounted on the shaft and disc and holds a standard size 80 column IBM type record card 381 wrapped around the surface of the drum. Mounted on the shaft 374 on the under side of the column indicator disc is a cam arm 384 having a notched program cam extension 385 thereon which cooperates with a pair of spring-biased contact levers 386 and 388, each of which is arranged to actuate a pair of electrical switch contacts designated PC1 and PC2. The configuration of the camming surface extension of the arm 384 is such that switch contacts PC1 will close when the program drum has advanced past the 80th column sensing position and will restore at column 88, while the switch contacts PC2 transfer at column 81½ and restore a column 88 of the column indicator disc, it being understood that the program drums are positioned one card column in advance of the card column of the detail card at the punching station, all as described in the aforementioned Gardinor patents.

The auxiliary program drum 336, mounted to the left and behind the regular or front program drum, is similar to the latter drum and is normally used as an auxiliary storage drum to control circuits which operate the punches in accordance with data perforated in an auxiliary or duplicating card 382 wrapped on this drum.

Extending transaxially across the top of each of the drums is a row of twelve star wheel sensing devices, one of which is illustrated generally at 390 in FIG. 12 herein. One of these sensing devices is provided for each one of the 12 rows of punching positions of the regular program card 381 and of the auxiliary duplicating card 382 and includes a pivoted lever 392 rotatably mounting a five-point star wheel 396 that is urged against the card on the drum by wire contact pressure springs 398 which bias the lever downwardly. When the wheel 396 drops into a perforation in the card, it causes an associated wire spring 398 to engage a terminal post 406 to close an electrical control circuit from a tab terminal 402 and through wire contact 398 and post 406 to conductor 404.

Figure 16C:
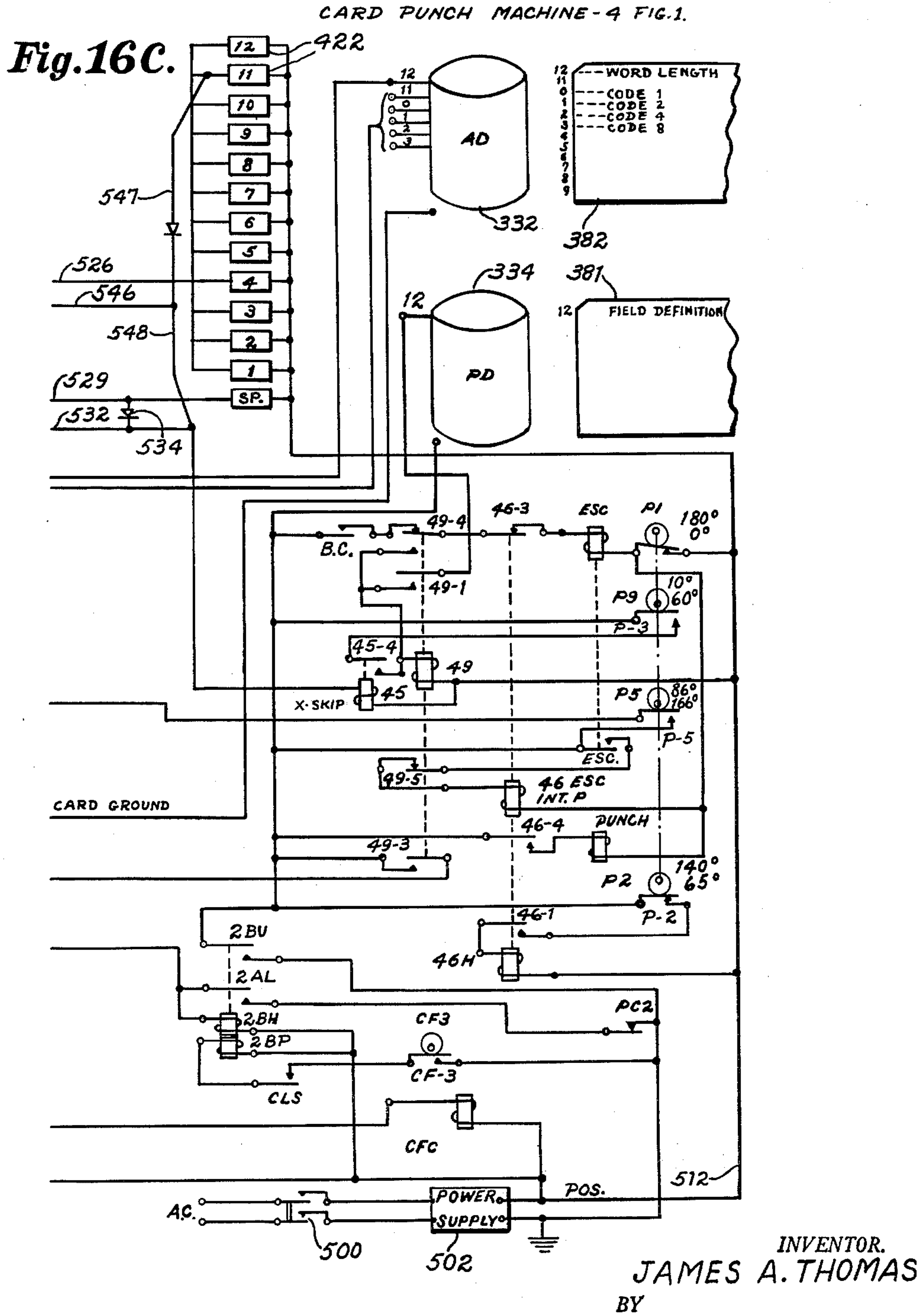

The punching mechanism 324 includes a row of 12 punches, 410, one for each of the 12 vertically spaced rows of the detail card. As indicated in FIG. 11, each punch receives one end of a pivotally mounted punch operating lever arm 412, the other end of which has a punch operating interposer in the form of a bell crank lever 414 pivotally mounted thereon. One end of the bell crank forms a latch arm 415 which normally engages the hooked or notched end 420 of an armature 419 controlled by a punch interposer magnet 422, one of which is provided for each of the 12 punchhes. Energization of the magnet unlatches the punch operating interposer 414 to swing its hooked arm 416 downwardly beneath a punch operating bail 424 and to move its latch arm 415 upwardly to raise an interposer bail 426 and close a set of interposer bail contacts, labelled B.C. These contacts are actuated by the interposer bail 426 whenever any of the 12 punch interposer magnets 422 or a space interposer magnet shown in the simplified circuit schematic of FIG. 16C is energized, and function to bring about an escapement through energization of the escape magnet 369 (ESC.), which causes the energization of the punch clutch magnet 349.

The escape magnet, designated ESC., may be energized by depression of a key on the key punch keyboard which energizes an interposer magnet such as 422 and trips the interposer bail 426 to close the bail contacts B.C. through which power is supplied to energize the escape magnet. The escape magnet 369 then unlatches its armature 370 from an escapement wheel 371 at the end of the escapement gear train 368 of FIG. 10 to advance the escapement wheel and the elements driven through the escapement gear train. At the end of the escapement armature travel, the energizing circuit of the escape magnet is interrupted to permit the escapement wheel to be advanced one step corresponding to one card column, and an energizing circuit is completed to the punch clutch magnet 349. Energization of the punch clutch magnet engages the punch clutch 348 with the key punch drive motor 344 to bring about a cycle of revolution of operation of the punch cam shaft 350 of FIG. 10 herein.

The punch cam shaft mounts a pair of spaced cams, one of which is shown at 430 engaged by a roller 432 to cause oscillation of the punch operating interposer bail 424 of FIG. 11. When the bail 424 is engaged by the hooked ends 416 of the selected punch operating interposer bell cranks 414, it will rock the associated punch operating lever or levers 412 counter-clockwise to elevate the related punches 410 which strike the record card at approximately 93 degrees of the punch cycle.

The electrical schematic circuit diagram for a currently available IBM type 026 key punch machine suited for use with the typewriter-accounting machine installation described herein is illustrated in FIGS. 19A, B, C and D of applicant's copending application Serial No. 747,005, only so much of a simplified version of a portion of which is illustrated herein as is deemed necessary for an understanding of the principles of the present invention. As described in the aforesaid application, the keypunch circuits normally controlling the auxiliary program drum 336 and the circuits normally established from the star wheel switch contacts thereof are disabled, to permit access to the star wheel switch contacts that are used instead, to control the energization of the matrix relays of that portion of the control unit for controlling the card punch machine from the accounting section of the typewriter-accounting machine. The matrix relays determine the order of selection and the number of the accounting machine actuator racks to be read in a predetermined numerical punching sequence from the accounting machine and have their contacts, several sets of which may be associated with the same relay, connected in a single input-plural output whiffle tree arrangement.

CARD PUNCH CONTROL UNIT

The card punch control unit 6 is shown housed in a cabinet 451 below the accounting machine and includes a plurality of control relays, a control plugboard 454 and the aforementioned alpha encoder board 292, which has been added together with three new relays K136, K137 and K138 to the control unit of application S.N. 747,005. Only those control relays and portions of the control unit of the aforesaid application are mentioned herein as appear necessary to understanding the present invention. With reference to FIG. 16B, these relays include the matrix relays K101 through K104 and K110, the word length control relay K112, the punch indication relay K105, the card indication relay K106, the punch disable relay K107, the control unit word length interlock relay K113, the control interlock relay K114 and the control transfer relay K115, the functions of all of which relays are explained in the aforesaid application directed to punch control operations of the card punch machine from the accounting machine.

Relay K136, called a typewriter interlock relay herein, is operative upon initiation of a skip operation of the card punch machine and includes a set of normally closed contacts K136–A in the energizing circuit of the typewriter drive trip solenoid 196 that prevent operation of the typewriter during a skip operation of the card punch machine initiated, for example, from a tab operation of the typewriter.

Relay K137, called a control unit alpha interlock relay, is energized upon initiation of an accounting machine cycle and includes a set of normally closed contacts K137–B in the energizing circuit of the typewriter drive trip solenoid 196 to prevent operation of the typewriter during operation of the accounting machine, a set of normally open contacts K137–C in the return control line from the punch cam actuated switch P–5 of the card punch machine to permit pulsing and reading of the decimal read-out switches 44 of the accounting machine only when the card punch machine is operated from the accounting machine, and a third set of normally open contacts K137–A which function as holding contacts when the relay is energized. Since cam switch P–5 is operated during a punch cycle initiated from either the accounting section or the typewriter secion of the combined machine and since relay K137 is not picked from operation of the typewriter, the normally open contacts K137–C thereof prevent undesired pulsing of the accounting machine decimal switches that would otherwise occur during punching cycles initiated from the typewriter even though the machine carriage did not contain a numeric punch indication pin therein at this carriage position thereof.

Relay K138, also referred to herein as a punch discrimination relay, is effective in typewriter carriage positions in which the card punch machine is not to be operated from typing operations of the typewriter initiated in such carriage positions, and functions to retain the card punch machine disabled as typing continues past subsequent preselected carriage positions where alpha card punching otherwise would have been enabled had the typing originally commenced in one of said preselected carriage stop positions, as will be explained later. Relay K138 includes a set of normally open holding contacts K138–C shunting typewriter timing switch S55, a set of normally closed contacts K138–B connected between one side of the alpha punch indication switch S32 and a set of contacts K112–D of the word length control relay, and a third set of normally open contacts K138–A in circuit with the space bar actuated switch 260.

Figure 14:
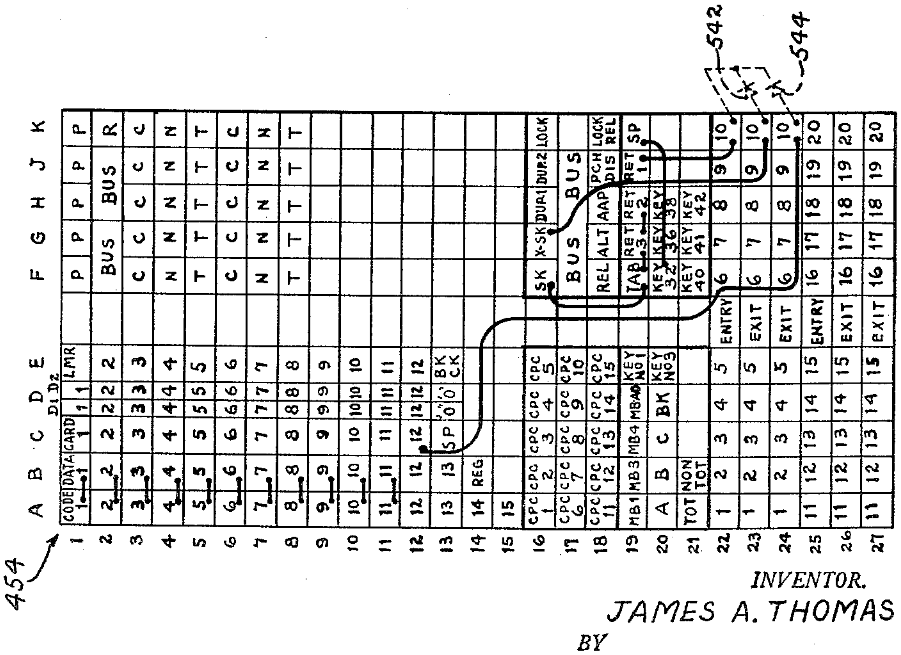
FIG. 14 is a front view of the control plugboard of the card punch control unit as used herein for numerical and alphabetical punching control of the card punch machine from the typewriter-accounting machine.

The plugboard 454, used for programming purposes, is illustrated in FIG. 14 and is substantially similar to the plugboard described in the aforesaid application S.N. 747,005 except for the provision thereon of separate hubs in row 19 of columns F, G, H, J and K thereof for the switches actuated by the tab and return keys 94—1 through 94—4 and the space bar 92 of the typewriter keyboard 60 and for the hubs in rows 20 and 21 of columns F, G and H for making available at the board the output terminal of some of the typewriter keys identified at 460 in FIG. 3. The character rack section comprising the first 13 rows of column D of the plugboard is shown as a split column D1 and D2 in which the column D2 is used for separate programming of a read-out switch unit provided for an additional character rack of the accounting machine section of the combined typewriter-accounting machine. As explained in applicaction S.N. 747,005, the plugboard distributor hubs of rows 22 through 27 and columns A through E, F through H, and J and K of the plugboard herein are used in sets of three, one entry and two exits, to accomplish two functions from a single pulse. Connected from two exit hubs, as K,23 and K,24, at the rear of the plugboard are a pair of circuit isolation diodes, as 542 and 544, which are connected to the entry hub K,22 associated therewith.

Figure 15:
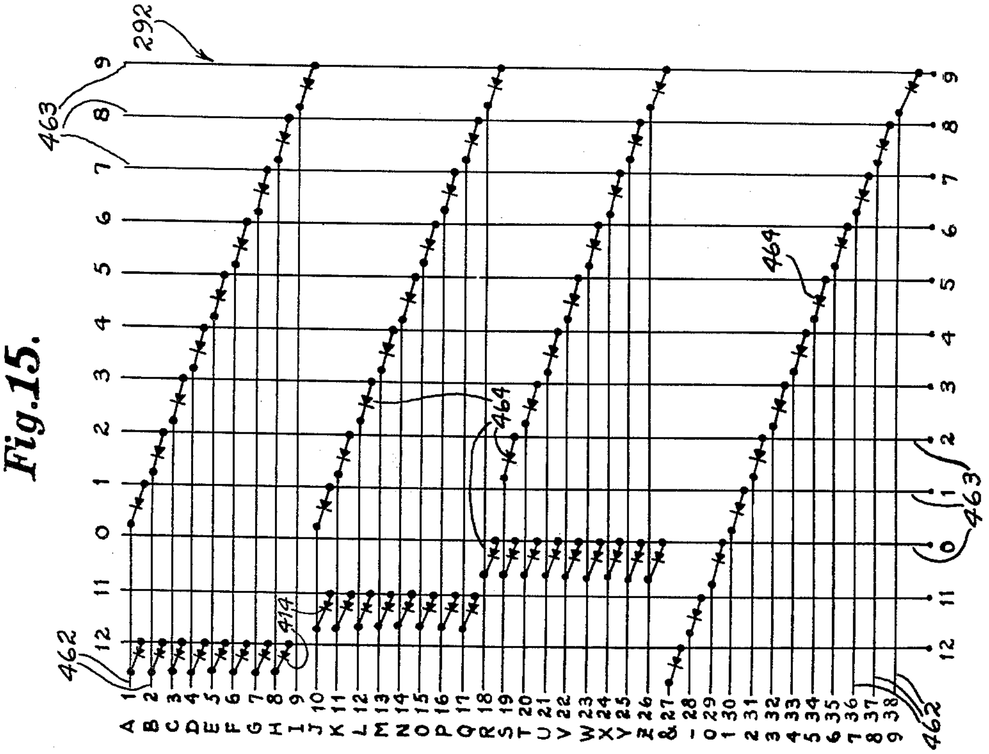
FIG. 15 is an electrical schematic of the alpha encoder section of the card punch control unit herein for alpha punching control of the card punch machine from the typewriter section of the typewriter-accounting machine.

The typewriter encoder board 292 is shown schematically in FIG. 15 herein as a diode matrix encoder which includes thirty-eight horizontally disposed input lines 462 and twelve vertically disposed output lines 463 that are connected to various input lines through selenium diodes 464. The input lines 1 through 38 are connected over a 38 conductor cable 466 to the output terminal pads 284 of different ones of the individual typewriter character read-out switches in accordance with the alphabetical symbol or numerical character designation of the typewriter key actuated switches connected to the encoder board, while the output lines 12, 11, and 0 and 1 through 9 are connected over a 12 conductor cable 468 to one side of respectively corresponding ones of the twelve numerical punch interposer magnets 422 of the card punch machine. Depression of the "A" key of the typewriter, for example, closes the read-out switch associated therewith to complete a circuit to input line A–1 of the encoder board from which a pair of output circuits are available from output lines 12 and 1 to the "12" and "1" interposer magnets of the card punch machine through the two diodes connected to input line 1 and output lines 12 and 1 as illustrated. It is to be noted that each of the input lines 29 through 38 for the ampersand symbol "&," the dash symbol "—," and the numerical characters 0 through 9 of the typewriter keyboard activate only a single one of a different one of the output lines or provide only a single output path therefrom.

OPERATION

With reference to FIGS. 16A, B and C, the system is conditioned for operation by closing the main line switch 500 on the card punch machine 4 to apply operating voltage to the input of the card punch machine power supply 502, by depressing latch down key 27—8 on the accounting machine keyboard to close switch S8 and apply operating voltage to the separate power supply 504 of the control unit 6, and by depressing the on-off key 96 to actuate switch 99 of the typewriter and apply operating voltage to the separate power supply 98 of the typewriter section of the typewriter-accounting machine 2.

The control transfer relay K115 is connected across a pair of conductor lines 508, 509 leading from the D.C. output terminals labelled "+" and "Ov," respectively, of the control unit power supply 504 and transfers its contacts, including contacts K115–E and K115–F, upon energization thereof to supply low potential through its now closed contacts K115–F and the normally closed contacts K106–B of the yet de-energized card indication relay K106 to one side of the card feed switch S6 in the accounting machine. The closing of the contacts K115–E of the control transfer relay K115 places the control interlock relay K114 in the control circuit of the card punch machine for energization therefrom through the normally open contacts 49—3 of the skip relay 49 thereof whenever the latter relay is energized. Plus potential is also made directly available to one side of the various control relays of the control unit illustrated in FIG. 16B including the relays K106, K107, K113, K136, K137 and K138 and through the normally closed contacts K114–E of the de-energized control interlock relay K114 to the matrix relays K101 through K104 and K110, the punch indication relay K105 and the word length relay K112, as illustrated.

The card feed switch S6 on the accounting machine keyboard is then momentarily actuated by momentary depression of the feed key 27—6 on the accounting machine to supply low potential from the control unit power supply to one side of the card feed clutch magnet CFC of the card punch machine, the other side of which is connected to the D.C. positive supply conductor 512 connected to the high potential or positive output terminal of the energized power supply 502 thereof, thereby tripping the one-revolution card feed clutch to cause the release of the first card from the card hopper and the positioning thereof at the pre-registration position B of FIG. 9.

With the release of the first card during the first card feed cycle, it enters between the aforementioned card sensing lever 342 and contact button 343 to close the card lever switch CLS of FIG. 16C after the card feed cam actuated switch CF–3 has opened, and a second card feed cycle is initiated by again depressing the aforementioned card feed key 27—6 to again actuate the card feed switch S6 and initiate another card feed cycle in the card punch machine. During this cycle the pick coil 2BP of the card lever relay 2B of the card punch machine is picked through the now closed card lever switch CLS upon the reclosing of the card feed cam actuated switch CF–3. The relay 2B is held energized thereafter through a set of its holding contacts 2AL connected in series with its holding coil 2BH and the aforementioned contacts PC–2 of the front or regular program drum 334 that are maintained in the normally closed position shown from column 0 to column 81½ of the column indicator disc thereof.

With the release of the second card, the first card 323 is advanced to the full line position D of FIG. 9 in preparation for punching with its first column, column 1, located one step or column to the right of the punching line. The program cards 381 and 382 on the front or regular and the rear or auxiliary program drums 334 and 336, respectively, are located one card column in advance of the detail card to be punched and have their first column in position to be sensed by the star wheel actuated sensing switches respectively associated therewith.

With the energization of the card lever relay 2B of the card punch machine, the card indication relay K106 of the control unit is energized through the now closed holding contacts 2AL of the relay 2B and the closed contacts PC–2 of the regular program drum to make card ground potential, "OV," available from the control unit power supply and the now closed contacts K106–B to various parts of the control unit circuitry and to the common or one side of each of the star wheel actuated switches associated with the auxiliary program drum 336. The contacts K106–B of the card indication relay K106 open to disable the feed key switch circuit to the card feed clutch magnet of the card punch machine. Energization of the relay K106 also opens the normally closed contacts K106–A thereof which shunt the normally open contacts K114–F of the control interlock relay K114.

With the control unit and card punch machine control circuit energized and the registration of the detail card at the punching position, either the typewriter section 12 or the accounting section 10 of the typewriter-accounting machine may be operated and control the operation of the card punch machine therefrom.

CARD PUNCH OPERATION FROM ACCOUNTING MACHINE—GENERAL

Assuming that the carriage of the typewriter-accounting machine is at a carriage stop position, say stop position 1, where numerical data entered in the keyboard 20 of the accounting machine section 10 is to be punched in a numeric field of the detail 323 card in the card punch machine, the program tray 36 of the typewriter-accounting machine 2 will contain a numeric punch indication pin 55 in this carriage position in lane 31 thereof. Lane switch S26 of FIG. 16A, therefroe, will be closed to make "Ov" available from the control unit power supply 504 to one side of timing switch S14 that is closed by timing cam F1 on cam shaft 39 from 100 to 125 degrees of the accounting machine cycle. The accounting machine is then cycled, as by depresing one of the motor bars 24, to mechanically trip the one revolution clutch associated therewith and apply driving power to the main cam shaft of the accounting machine. Upon closure of cam switch S14, "Ov" potential is applied therethrough to one side of the punch indication relay K105 and to one side of the control unit alpha interlock relay K137.

The high potential side of relay K105 is connected to receive plus operating potential from the control unit power supply through the normally closed contacts K114–E of the de-energized control interlock relay K114. Relay K105 is thus energized and closes its contacts K105–A to establish a holding circuit therefor by providing card ground potential to the low potential side thereof from the now closed contacts K106–C of relay K106 and the serially connected normally closed contacts K113–A of the de-energized control unit word length interlock relay K113 and the normally closed contacts K107–A of the also de-energized punch disable relay K107.

The high potential side of the control unit alpha interlock relay K137 is connected directly to the plus output conductor 508 of the control unit power supply. The relay is thus energized upon the application of "Ov" potential to the low potential side thereof through the closing of cam switch S14 and transfers its contacts, including K137–A thereof which establish a holding circuit therefor to provide card ground potential to the low potential side of the coil thereof through the serially connected contacts K105–C of the now energized punch indication relay K105. As explained in application S.N. 747,005, the punch indication relay K105 is de-energized after the word length control relay K112 is energized, as will subsequently appear, causing the energization of the word length interlock relay K113 which opens its normally closed contacts K113–A in the holding circuit for the punch indication relay. Relay K112 energizes before the de-energization of relay K105 and establishes a holding circuit for relay K137 through contacts K112–B. After the de-energization of the punch indication relay and the opening of its contacts K105–C, an auxiliary holding circuit for the coil of the control unit alpha interlock relay K137 is established through the closed contacts K113–C of the then energized word length interlock relay K113, which is dropped out upon completion of the punching operation derived from the accounting machine section.

In accordance with a feature of the invention, it will be noted that the normally closed contacts K137–B of the relay K137 are connected in the energizing circuit of the typewriter drive trip solenoid 196. As the relay K137 is energized upon cycling of the accounting machine section and is held energized thereafter until the completion of the punch control operations initiated or derived therefrom, the contacts K137–B open to prevent accidental operation of the typewriter section during operation of the accounting machine and the card punch control operations derived therefrom.

At 250 to 262 degrees of the accounting machine cycle, timing switch S17 is closed by timing cam F2 to supply low potential from the "Ov" terminal of the control unit power supply 504 through the now closed contacts K105–B of the energized punch indication relay K105, the normally closed contacts K114–A of relay K114, the timing switch S17, and the normally closed or back contacts K112–A of the yet de-energized word length relay K112 to the input of the contact matrix 520 of the code exit matrix relays K101 through K104 and K110. Relay K112 is energized upon the closing of the wire switch contacts actuated by the star wheel associated with row 12 of the program card 382 on the auxiliary program drum 336. This row of the auxiliary program drum card is assigned for word length control purposes and does not contain a perforation therein for the first column of the punch control field thereof as indicated in FIG. 17A, in consequence of which the aforesaid star wheel actuated switch will be open and relay K112 will be de-energized with its contacts A to D herein in the positions shown in FIG. 16B.

As the program drums 334 and 336 are in their column 1 position, certain of the star wheel switches associated with the auxiliary program drum 336 will be actuated in accordance with the 1, 2, 4, 8 binary coding provided in rows 0, 1, 2 and 3 of column 1 of the auxiliary program drum card 382 to complete energizing circuits for certain ones of the control unit matrix relays. These relays receive plus potential from the high potential side of the control unit power supply through the normally closed contacts K114–E of relay K114 and card ground potential through the activated ones of the star wheel switches of the auxiliary program drum.

The contacts 520 of the matrix relays are connected in a whiffle tree arrangement illustrated in FIG. 22F of applicant's aforesaid application S.N. 747,005 and will establish one of a plurality of 15 selectively available code exit circuits from the input to the output thereof in accordance with the selective energization of the matrix relays from the auxiliary program card 382, column 1 of which is shown as containing perforations in rows 0, 1 and 3 thereof representing binary code 11. The aforementioned pulse obtained during the closure of timing switch S17 is thus applied over one of the conductors of multiple conductor cable 522 to the rear of the #11 code exit terminal of column A of the control unit plugboard 454.

For a straightforward punching application, for example, in which, let it be assumed that, columns 1 through 11 of the detail card 323 are to be punched in accordance with the numeric values indexed in columns 11 to 1 of the accounting machine keyboard in the aforesaid carriage position of the accounting machine, the code exit terminal hubs of column A of the plugboard are patch wired to the terminal hubs of the first 11 rows constituting the data rack section of plugboard column B in accordance with the desired sequence of reading the decimal switches of the accounting machine section. Thus, the first activated code exit terminal, #11, may be patch wired to the #11 data rack terminal hub, which is connected from the rear of the plugboard over one of the conductors of a multiple cable conductor 524 to the common or input terminal of the decimal switch associated with the highest denominational order of the data racks 30, i.e. rack #11, to be read in the aforesaid carriage stop position of the accounting machine.

From the data output setting of the programmed decimal switch, the pulse derived from the closing of timing switch S17 is then routed over one of the conductors of another multiple conductor cable 526, which is connected to the rear of respective ones of the terminal hubs of the first 13 rows of the card entry section of column C of the plugboard and also to the card punch machine interposer magnets 422, to one of the interposer magnets whose numeric punch value corresponds to the digital value of the indexed key, say the unit or 1 key, of the accounting machine in the keyboard column thereof corresponding to the denominational order of the decimal switch selected from the activated code exit terminal of the program plugboard.

The low potential pulse applied to the aforesaid one of the card punch interposer magnets 422 from timing switch S17 through the matrix contacts and the plugboard programmed decimal switch energizes the F1 interposer magent, the high potential side of which is connected to the positive output terminal of the card punch machine power supply 502, and causes the interposer bail contacts B.C. to close resulting in the following sequence of events in the card punch machine control circuit of FIG. 16C. The escape magnet ESC is energized through the normally closed contact set 49—4 of the de-energized skip magnet 49, the normally closed contacts 46—3 of the de-energized escape interlock magnet 46, and the normally closed contacts P–1 of punch cam P1, which, together with the other punch cams illustrated, is sitting at its 345 degree rest position. The escape magnet ESC then releases its armature 370 from the end of the escapement gear train of FIG. 10 to permit escapement of the detail card and the program drums and closes its escape contacts, labelled ESC in FIG. 16C, to energize the pick coil of the escape interlock magnet 46P through the normally closed contacts and the now closed contacts 2BU of the previously energized card lever relay 2B, positive potential being supplied to the pick coil 46P from the positive supply conductor 512 of the card punch machine power supply through the closed contacts of punch cam actuated switch P–1.

The escape interlock magnet 46 transfers its contacts, including 46—3, which open to de-energize the escape magnet ESC in time to permit an escapement of one card column of the detail card 323 from column 0 to column 1 and of the program drum cards from column 1 to column 2 thereof, the escape interlock magnet 46 being held energized thereafter by its hold coil 46H which is energized through the transferred contacts 46—1 and the closed contacts P–2 associated with punch cam P2 closed from 140 to 65 degrees of the punch cycle and now sitting in its 345 degree rest position. An energizing circuit is then completed through the transferred contacts 46—4 of the escape interlock magnet 46 to energize the punch clutch magnet P to permit a cycle of revolution of the punch cam shaft which drives the punching mechanism to cause the punching of a "1" in column 1 of the detail card in the row corresponding to the actuated punch interposer at 77 degrees of the punching cycle.

The program drum cards having been advanced to column 2 thereof, the star wheel actuated switches sense the perforated coding in the auxiliary program card 382 to change the energization of the control unit matrix relays K101–K104 and K110 for selection of another code exit circuit path from the output of the contact matrix 520 thereof. The second column of row 12 of the auxiliary program drum card 382 contains a perforation therein as indicated in FIG. 17A. The #12 star wheel actuated switch of the auxiliary program drum thus closes to complete a ground circuit from the card ground terminal of the card indication relay contacts K106–C of the low potential side of the word length control relay K112, the high potential side of which is connected to the plus potential side of the control unit power supply 504 through the normally closed contacts K114–E of the control interlock relay K114, resulting in the transfer of the contacts of the relay K112.

At 86 degrees of the aforementioned punch cycle, the contacts of punch cam actuated switch P–5 of the card punch machine are closed by punch cam P5 to supply a ground pulse from the card punch machine power supply 502 through the transferred contacts 2BU of the previously energized card lever relay 2B, cam switch P–5, the transferred contacts K137–C of the previously energized control unit alpha interlock relay K137, and the transferred contacts K112–A of the now energized control unit word length relay K112 to the input of the contacts 520 of the matrix relays, which have been selectively energized in accordance with the perforated binary coding in column 2 of the auxiliary program card to provide a different code exit output therefrom to the programming plug board. The code exit hub of the selected code exit is patch wired on the face of the plugboard to the data rack hub of column B thereof for the next highest order decimal switch to be read in the aforesaid stop position of the carriage of the accounting machine. This hub is connected over one of the conductors of cable 524 to the common or input terminal of the programmed decimal switch unit contained in the accounting machine decimal switch readout unit 44.

From the data output setting of the programmed decimal switch the pulse supplied from the closing of the card punch cam switch P–5 is routed over one of the conductors of output cable 526 past the card entry section of column C of the plugboard and to one of the card punch interposer magnets whose numeric punch value corresponds to the digital value of the indexed key, say #2, of the accounting machine in the keyboard column thereof for, say, the next denomiantional order of the decimal switch selected from the activated code exit terminal of the plugboard from the second column of the card 382. Energization of this interposer magnet closes the interposer bail contacts B.C. to initiate a second punching cycle as aforementioned, resulting in escapement of the program cards to column 3 and escapement of the detail card to column 2 followed by punching of a "2" in the latter card and the closing of card punch cam switch P–5 to supply another punch through the changed setting of the matrix contacts effected from the coding of column 3 of the auxiliary program card to select another code exit output therefrom.

This action continues until the last decimal switch to be read has been selected under the control of the binary coded perforations in rows 0, 1, 2 and 3 of the last column (column 11) of the punch control field of the auxiliary program drum card. In the aforementioned numeric punching example in which the decimal switches associated with key columns 11 to 1 of the accounting section keyboard 20 were to be read and the digital values thereof to be punched in columns 1 to 11 of the detail card, the latter card will be at column 10 when the auxiliary program card is at column 11 where the start wheel switches associated therewith will sense the perforations in column 11 thereof to provide the last code exit, i.e. code exit 1, from the matrix contacts and route the pulse, which is supplied from card punch cam switch P–5 after the punching of column 10 of the detail card, through the selected code exit path to the column of the last decimal switch programmed from the plugboard. From the data output setting of this decimal switch, the pulse is applied to the corresponding punch interposer magnet which actuates the interposer bail contacts B.C. causing an escapement of the program cards to column 12 and the detail card to column 11 in which the numeric value of the activated interposer is punched. Column 12 of the auxiliary program card corresponds to the beginning of the next punch control field therein and will not have a perforation in the word length zone of row 12 thereof, as indicated herein.

Due to the absence of a word length perforation in the aforesaid column of the auxiliary program drum card, the #12 star wheel actuated switch thereof will open to remove card ground potential from the word length control relay K112. The relay will then be de-energized and will restore its contacts, including contacts K112–A which open to prevent the pulse derived from punch cam switch P–5, after the punching of column 11, of the detail card, from being supplied to the input of the contact matrix 520 of the matrix relays K101–104 and 110 and further punching of the detail card, now sitting in column 11, is halted.

Subsequent operation of the accounting machine in carriage positions containing a numeric punch indication pin in lane 31 thereof causes subsequent punching of the detail card over punch fields therein under the control of the word length and code exit punchings of subsequent control fields of the auxiliary program card which has been prepunched to provide the desired sequence of reading of the decimal switches of the accounting machine and/or the functional controls of the card punch machine in each of the various carriage stop positions of the accounting machine from which the card punch machine is to be controlled.

It will be appreciated that the above described numeric punching operation of the card punch machine from the accounting machine section is but one of many possible modes of operation available therefrom and the control unit, which can be programmed to provide punching of fixed and variable data and various automatic functional and other control operations of the card punch machine, as described in application S.N. 747,005.

CARD PUNCH OPERATION FROM TYPEWRITER SECTION

Assuming now, that after the aforesaid number punching of the first 11 columns of the detail card 323 from the accounting machine section of the combined typewriter-accounting machine, it is desired to operate the card punch machine for alpha punching from the typewriter section. The carriage 16 of the typewriter-accounting machine will be at, say, carriage position II containing an electrical control pin in lane 37 of the program tray 36 thereof to close lane switch S32, it being understood that lane 31 of the program tray will not contain a numeric punch indication control pin in this carriage position. Consequently, relay K137 is not energized for alpha punching control operations from the typewriter, whereby its normally open contacts K137–C prevent the transfer therethrough to the input of the matrix contacts 520 of pulses derived from the operation of punch cam switch P–5 on alpha punching operations and its normally closed contacts K137–B restore control of the typewriter drive tip solenoid 196 to permit operation of the typewriter from the keyboard 60 thereof under these conditions. It can be appreciated that in the absence of the contacts K137–C of the relay K137, undesirable pulsing of the decimal read out assembly of the accounting machine otherwise would take place from typewriter card punching operations even though the machine carriage did not contain a numeric punch indication pin in such positions of the carriage.

Depression of a typewriter character key causes the momentary actuation of switch 194 to energize the drive tip solenoid 196 for a power cycle of the typewriter. At 30 degrees of this cycle, typewriter timing cam T1 actuates switch S54 to pulse the character read out switch actuated by the depressed typewriter key over a circuit traced from the "Ov" output terminal of the control unit power supply and through the alpha punch indication switch S32, the normally closed contacts K138–B of de-energized control relay K138, the back contacts of K112–D of the de-energized word length control relay K112, timing switch S54, and the normally closed contacts of switch S60 operated from the code slide 7 of the typewriter to the common bus conductor 280 of the alpha read out section 250 thereof. From the activated character read out switch the pulse is supplied over one of the conductors of cable 466 to one of the 38 inputs of the alpha encoder 292, the twelve outputs of which are connected over multiple conductor cable 468 to the rear of respectively corresponding ones of the card entry terminal section of the plugboard, which are also connected to the card punch interposer magnets. Where the depressed key is an alphabetical character key, such as the letter "A," two pulses are supplied from the output of the encoder board as previously explained to pulse two of the interposer magnets in accordance with the alpha code punching format employed for this card punch system.

It can be appreciated that if the selected character key was not depressed sufficiently to actuate switch 194 and initiate a typewriter power cycle, the character read out switch associated with this key would not be pulsed even though the contacts thereof might have been closed as may be the case with other forms of typewriter controlled punching devices in which pulsing of the punch magnets is derived directly from the actuation of the keys irrespective of whether or not a writing cycle is actually initiated in the typewriter resulting in punching without typing.

Energization of the aforesaid interposer magnets causes the interposer bail contacts B.C. to close and operates the card punch machine to escape the program cards and detail card one column followed by the alpha punching of the detail card in, say, card column 12 thereof.

As in the case of the numeric punching from the accounting machine section, the first column, i.e. column 12, of the word length control field provided for the alpha punching control field of the auxiliary program card does not contain a zone 12 perforation therein. Thus, the word length control relay K112 is not energized until the card punch operation initiated from the first typing cycle escapes the program cards to column 13. The #12 star wheel actuated switch for row 12 of the auxiliary program card finds a perforation column 13, as indicated in FIG. 17A, and closes its contacts to complete an energizing circuit to supply card ground to the word length control relay which transfers its contacts from the position shown.

At 158 degrees of the aforesaid typewriter cycle, typewriter timing cam T2 closes switch S55 to pulse the relay K138, which receives plus operating potential from the positive output supply conductor 508 of the control unit power supply 504 and transfers its contacts from the position shown, including the opening of its normally closed contacts K138–B thereof.

With the completion of the first power typing cycle and the alpha punching of card column 12 of the detail card corresponding to the beginning of the alpha punch field therein, the selected alphabetical character "A" has been printed on the record medium 35 on the carriage platen and the carriage has escaped one letter space position in preparation for the next cycle of operation of the typewriter. Depression of the next typewriter key momentarily closes switch 194 and energizes the drive trip solenoid 196 to initiate another typewriter cycle at 30 degrees of which timing switch S54 closes to supply a pluse over a circuit traced from card ground of the control unit power supply, the upper transferred contacts K112–D of the now energized word length control relay K112, timing switch S54 and slide 7 switch S60 to the input side of the character read out switch provided for the depressed typewriter key. The output of the activated read out switch is connected over one of the conductors of cable 466 to the input of the alpha encoder 292 to pulse the interposer magnets as previously described.

A second card punch cycle is then initiated after a columnar escapement of the program cards to column 14 and the detail card to column 13 resulting in the alpha punching of column 13 of the latter card. Alpha punching is continued under the control of the word length perforations of row 12 of the auxiliary program card until the end of the control field therein when the auxiliary program card will have advanced to the beginning of the next punch control field programmed therein, signified by the absence of a zone 12 perforation in the first column thereof located in column 48 of the program card. Relay K112 then de-energizes to restore its contacts to the position shown in which the card ground circuit previously supplied through the upper contacts of K112–D thereof is interrupted to halt further punching of the detail card therefrom.

After the typing of the last character, the numeral zero "0," of the typing field initiated from carriage stop position II, one of the tab-return carriage control keys, say return key 94—3 is actuated to space the platen vertically and to return the carriage as explained in the Gavasso application to carriage stop position III, shown located 20 letter space positions to the left of the zero. Actuation of the key 94—3 also opens switch S95 which drops out the punch discrimination relay K138 and restores the control unit in preparation for punch control operations to be effected from a subsequent alpha or numerical punch indication control position of the carriage, now at position III.

In accordance with one aspect of the invention, it will be apparent that the contacts K112–D of relay K112 are effectively in shunt with lane switch S32 and contacts K138–B of relay K138 through which the first pulse for initiating a typewriter controlled punch cycle is supplied when the typewriter carriage is at the beginning of a typing field in a position containing an alpha punch indication pin 55' in the program tray of the machine carriage and that the contacts K112–D of the relay K112 thereafter control the pulsing of the character read-out switches as the typewriter carriage escapes to subsequent letter space positions displaced from the alpha punch indication pin for subsequent punching operations there from. Thus, punching operations effected from the letter space positions of the typewriter carriage subsequent to the first line or punch actuating letter space position are under the control of the word length programming of the auxiliary program card. When the star wheel actuated switch for this zone finds an absence of a perforation therein, punching operations of the card punch machine are halted, irrespective of whether or not the typing field of the typewriter has been completed.

In accordance with the invention, while typing operations may be continued in the typewriter, no punching of the detail card will be effected through the word length relay contacts when the word length relay has been dropped out due to the absence of a perforation in zone 12 of the auxiliary program card. This action is illustrated with reference to FIGS. 17A, C and D in which the data "Detroit, Michigan" is to be typed on the sheet 35 in the typewriter from carriage stop position III. The program cards are positioned at column 48 and the detail card 323 is positioned at column 47 in which a zero has been punched from the last character typing operation of the typewriter in the last typing field commenced at carriage stop position II.

It will be noted that only 13 columns have been allotted for the punch control field of the auxiliary program card 382 and the corresponding punch field in the detail card, which is three columns less than the 16 letter space positions, including the comma, occupied by the data "Detroit, Michigan" to be typed in this typing field of the typewriter from carriage position III. Thus, when the program card 382 escapes from column 60 to column 61, which does not contain a perforation in zone 12 thereof as the latter column has been allotted to the start of the next punch control field therein, the #12 star wheel actuated switch opens to drop out the word length control relay K112 to prevent further pulsing of the typewriter character read-out switches from the operation of card punch cam switch P-5 after the punching of the thirteenth letter, the letter "I," of this data in the thirteenth column, column 60, of the punch field in the detail card assigned to this type of data. Thus, further escapement of all of the cards and punching of the detail card is halted, notwithstanding the continued operation of the typewriter to complete the remainder of the data, the last three letters "GAN," on the record medium 35 on the platen carriage of the typewriter.

Incidentally, the comma appearing between the typed data "Detroit, Michigan" is derived from the key of section 460 of the typewriter keyboard adjacent the "M" Key, and the read-out switch associated with the comma key has its output terminal connected to the rear of terminal hub F,20, labelled Key 32, on the control unit plugboard 454. This terminal hub may be patch wired to the space hub K,19, labelled SP, the rear of which is connected over conductor 529 to one side of the Space interposer, labelled SP in FIG. 166, of the card punch machine to provide a column of escapement therein whenever the space interposer is pulsed, as from the comma key of the typewriter, for example. It will be appreciated that the other keys of section 460 of the typewriter keyboard have the output terminals of the readout switches associated therewith connected to the rear of respective other ones of the terminal hubs labelled keys 36, 38, 40, 41 and 42 of the plugboard 454 of FIG. 14 and may be patch wired on the face of the plugboard to provide for punching of various fixed data or to control functional operations of the card punch machine therefrom.

In accordance with a related aspect of the invention, where the data being typed on the sheet 35 in the typewriter occupies a number of letter space positions that is less than the number of card columns of the word length control field allotted in the auxiliary program card for a typing field started from an alpha punch indication carriage stop position, the tab control key 94—4 may be actuated after typing the last character of the data in this typing field to tag the typewriter carriage to the next tab stop position thereof and to skip the cards of the card punch machine over the remaining columns of the word length control field corresponding to the number of letter spaces skipped in the typewriter. This action will be described with reference to carriage stop position IV indicated in FIG. 17D from which the data "USA" is to be typed on sheet 35 and is to be punched in the punch field of the detail card 323 beginning with column 61 and extending through, say column 66 thereof. It is assumed also that one of the typewriter tabulation or return control keys, say, 94—4, has been actuated to tab the carriage to position IV after the typing of the data commenced in carriage stop position III and to operate switch S95, which drops out the relay K138 in order to restore the control unit for operation in preparation for the control operations therefrom for carriage stop position IV of the typewriter-accounting machine.

After the typing of the last letter "A" of the new data commenced in position IV and the punching thereof in column 63, of the detail card, the tab key 94—4 is again depressed, closing switch 194 to initiate a non-printing typewriter power cycle and opening switch S95 to drop out relay K138 which was energized by the closing of typewriter cam switch S55 during the first typing cycle initiated at this carriage stop position. Since the typewriter carriage is displaced from the carriage stop position V, the carriage will then tabulate 3 letter space positions, after the typing of the last letter of the data "USA," to carriage stop position V as explained in the aforesaid Gavasso application.

During the typewriter cycle initiated from the actuation of the tab key 94—4, card ground is supplied through the transferred contacts K112-D of relay K112 and the contacts of cam actuated timing switch S54, which are closed from 30 to 69½ degrees of the typewriter cycle, to the common of the tab key actuated switch 220—4, the other side of which switch is connected over conductor 530 to the rear of the plugboard TAB terminal, F,19. The hub of this terminal is patch wired on the face of the plugboard 454 to the hub of skip terminal SK,F,16, the rear of which is connected over conductor 532 to the X-Skip relay 45 and through the diode 534 to the Space interposer magnet SP., of the card punch machine.

Energization of the Space interposer closes the interposer bail contacts B.C. to initiate an internally programmed skipping operation of 3 columns of the card punch machine under the control of the field definition star wheel switch contacts associated with row 12 of the program card 381 on the front program drum 334. This card is shown as having a prepunched field definition control field therein embracing a number of columns corresponding to the number of columns, column 61 through 66, of the word length control field of the auxiliary program drum card effective in these column positions of the detail card. Column 61 of the program cards, however, is blank, as this is the beginning of the next control field of these cards. Closing of the interposer bail contacts B.C. energizes the card punch Escape Magnet ESC for a column of escapement of the program cards from column 64 to column 65. The contacts labelled ESC of the Escape Magnet close to pick the Escape Interlock Magnet 46P, which transfers its various contacts from the position shown in FIG. 16C, dropping out the Escape Magnet through the opening of its contacts 46—3 and causes the energization of the punch clutch magnet Punch to initiate a punch cycle, although no punching of the detail card will take place upon the subsequent card escapement as none of the numeric punch interposers were energized.

Since the X-Skip relay 45 also was energized, its contacts 45—4 complete an energizing circuit to the Skip relay 49 through punch cam actuated switch P-3 which is closed by punch cam P3 from 10 to 60 degrees of the punch cycle. The Skip relay 49 then transfers its contacts from the position shown to supply ground from the card punch machine power supply 502 through the transferred contacts 2BU of the previously energized card lever relay 2B to one side of the switch actuated by the #12 star wheel associated with the front program card 381, shown as having a zone 12 hole in column 65 thereof. The other side of this switch is connected through the now transferred contacts 49—1 of the energized Skip relay 49 to retain the latter relay energized under the control of the field definition programming of the front program card. This star wheel switch also supplies ground over a circuit through the transferred contacts 49—1 and 49—4 of the Skip relay 49 to place the pull-in and hold of the Escape magnet under control of field definition. The transferred contacts 49—5 of the energized Skip relay 49 prevent the re-energization of the Escape Interlock Magnet 46P after the hold coil 46H thereof has been dropped out at 65 degrees of the punch cycle, since the re-energization of this magnet would otherwise cause the de-energization of the Escape magnet through contacts 46—3 and prevent successive columnar escapements of the cards.

Columnar skipping is continued from column 65 to column 66 and from 66 to 67 until the #12 star wheel finds an absence of a perforation in zone 12 of a column, i.e., column 67, of the front program card, at which time the Skip relay 49 and Escape magnet are de-energized through the opening of this star wheel switch to halt further skipping operations.

Under the above-described conditions, it will be appreciated that the number of card columns skipped will correspond to the number of letter space positions remaining in the typing field of the typewriter when the tab key 94—4 thereof was depressed, where the total number of letter space positions allotted to the typing field in the typewriter correspond to the number of columns allotted to the field definition control field of the front program card. Any lesser number of columns can be skipped, however, depending on the extent of the field definition control field of the front program drum.

It is to be noted that with the energization of the Skip relay 49 of the card punch machine initiated from the actuation of the aforesaid typewriter tab key 94—4, the contacts 49—3 of the Skip relay close to provide an energizing circuit for the coil of the word length control interlock relay K114 through the transferred contacts K115–E of the previously energized control transfer relay K115 of the card punch control unit 6. Upon energization, relay K114 transfers its contacts, including K114–F to connect the low potential side of the control relay K136 to the "Ov" supply terminal of the control unit power supply 504 over a circuit through lane switch S32, which is actuated by an alpha punch indication pin in lane 37 of the control panel when the typewriter carriage has tabbed to the next tab stop position, i.e. carriage stop position V, controlled from the depressed tab key, and over conductors 536, 537 and 538, the now transferred contacts K114–F, and conductor 539. The high potential side of the control relay K136 is connected to the plus output terminal of the control unit power supply 504, resulting in the energization of the relay and the opening of its normally closed contacts K136–A. In accordance with another feature of the invention, these contacts are serially connected in the energizing circuit of the typewriter drive trip solenoid 196 and are provided in order to prevent energization and tripping of the typewriter solenoid should a typewriter key be depressed while the card punch machine is still skipping over the remainder of the field in which the aforesaid tab key was depressed to initiate the skipping operation in carriage stop position IV.

In a related aspect, while the typewriter carriage is tabulating and before it has reached stop position V controlled from the depressed tab key, the carriage tab sensing switch S49 is actuated to close from the lever arm 5577 of the carriage control unit 18, shown in FIG. 3 herein, to energize the control relay K136, which prevents the energization of the typewriter drive trip solenoid 196 from a typewriter key while the typewriter carriage is tabulating. Thereafter, if the typewriter arrives at a tab stop position at which the carriage control panel 36 contains an alpha punch indication pin 55′ in lane 37 thereof, the relay K136 is maintained energized over the just previously described circuit through the contacts K114–F of the relay K114 and lane switch S32 to retain the control relay K136 energized until the end of the field definition control field in the front program card 381 interrupts the skipping of the card punch machine and drops out the skip relay 49 therein, thereby de-energizing the control interlock relay K113 and the typewriter interlock control relay K136 of the control unit.

If the control panel of the typewriter-accounting machine does not contain an alpha punch indication pin 55′ in the carriage position to which the carriage was tabulated from the aforementioned depression of the tab key 94—4, it will be apparent that the control relay K136 will be dropped out by the opening of the carriage tab sensing switch S49 when the carriage arrives at that position, even though the card punch machine has not yet completed the skipping operation initiated from the tab key. Thus the typewriter may be operated for non-punching typing operations at this time, overlapping its operations with the previously initiated and still continuing card punch skipping operations, so that the operator will not have to wait for the completion of the skipping operation in the punching machine. In this manner, the control unit of the present invention affords selective interlocking control of the typewriter keyboard during card skipping operations of the card punch machine depending upon the presence or absence of an alpha control pin in the carriage position to which the typewriter is tabulated or returned from a tab or return key.

It is apparent also that a double key depression of the typewriter keys during typing of any of the alphabetical data in the aforesaid carriage positions causes the normally closed switch S60, which is operated by typewriter code slide 7 under these conditions, to open and prevents transmission of a pulse to the input or commons of the typewriter character read out switches 250, thereby preventing the pulsing of the card punch interposers and punching of the card. Pulsing of the card punch interposers also is prevented in the event of an incomplete depression of a key insufficient to actuate a typewriter power cycle even though the character read out switch associated therewith may have been operated.

Turning now to a description of the control system for effecting abbreviated punching operations in the card punch machine from full word or unabbreviated typing operations of the typewriter in accordance with the present invention; assume that it is desired to type the full name of the customer, JOHN POE DOE, on the sheet 35 in the typewriter, but that it is desired to punch only the first two initiatls and the surname, JPDOE, in the detail card 323 in the card punch machine. For this purpose, three spaced tab stop positions, V, VI, and VII, will be programmed in the typewriter, each containing an alpha punch indication pin 55′ in lane 37 of the program tray for those carriage positions corresponding to the first letter of each of the first, middle and surname. The word length control field of the auxiliary program card 382 will be prepunched as indicated in FIG. 17A with the first three columns thereof, i.e. columns 67, 68 and 69, left blank and the remaining columns, say columns 70 through 74, of this field, each punched with a hole in row 12 thereof. Column 75 of the program cards will be blank, signifying the start of a subsequent control field therein.

Then with the typewriter carriage sitting in position V containing an alpha punch indication pin therein, the first letter "J" of the first word or name, JOHN, is depressed on the typewriter keyboard 60 to initiate a typewriter power cycle, at 30 degrees of which timing cam switch S54 closes to pulse the typewriter character readout switch for the depressed key through the previously described circuit from S32, now closed. The output terminal of this key is connected to the input of the alpha encoder 292 from which two output pulses are routed to energize a pair of punch interposers, #2 and #11, of the card punch machine to punch the appropriate alpha code in the detail card after a column of escapement of the program cards from column 67 to 68 and the detail card to column 67 in which it receives the "J" code punch.

With the printing of the letter "J" on the sheet in the typewriter carriage, the carriage escapes a letter space through the carriage control escapement mechanism of the typewriter to the next letter space position for the second letter "O" of the first name to be typed. This carriage position of the typewriter does not contain a punch indication pin therein, in view of which lane switch S32 is open and prevents pulsing of the character readout switches therethrough. The auxiliary program card 382 likewise does not contain a perforation in colmun 68 of the word length control field, in view of which the word length control relay K112 is de-energized with its contacts, including K112–D, in the position shown and prevents pulsing of the character read out switches 250 on the ensuing typing operations for the remaining letters "OHN," of the first name.

No punching and columnar escapements in the card punch machine will take place with the typing operations for the completion of the first name being typed in the typewriter. Upon completion of the typing of the last letter of the first name, the tab key 94—4 is actuated to tab the typewriter carriage to the next tab stop position, or position VI containing an alpha punch indication pin therein and to drop out the relay K138 which was energized by cam switch S55 during the first typewriter cycle effected in carriage stop position V. No skipping of the card punch machine will take place, as the relay K112 was not energized and the carriage was off of a punch indication pin when the tab key 94—4 was depressed after the typing of the last letter "N" of the first name of the customer. The program cards will still be at column 68 and the detail card at column 67 with a "J" code punch therein.

With the carriage now at punch active position VI, lane switch S32 is closed and timing cam switch S54 closes at 30 degrees of the typewriter cycle to permit pulsing of the character read-out switches after the depression of the typewriter key for the first letter "P" of the middle name, POE, of the customer being typed on the sheet 35 in the typewriter. The pulse will be supplied over a circuit from the "OV" terminal of the control unit power supply, lane switch S32, the normally closed contacts K138–B of the now de-energized control relay K138, the back contacts of K112–D of the still de-energized word length control relay K112, timing cam actuated switch S54, and slide 7 switch S60 to the character read-out switch section associated with the typewriter keyboard. This results in picking the card punch interposer magnets for the letter "P" and in a column of escapement of the program cards from column 68 to column 69 and of the detail card from column 67 to column 68 in which it receives the code punch for the letter "P."

Since column 69 of the auxiliary program card does not contain a zone 12 word length perforation therein and the typewriter carriage has escaped one letter space position off of the lane 37 pin with the typing of the first letter of the middle name of the customer, no further pulses from lane switch S32, now open, nor any pulses through the contacts K112–D of the still de-energized word length control relay K112 will be available upon the following typing operations for the remaining letters of the customer's middle name, and no further punching operations will ensue. Upon the completion of the typing of the last letter "E" of the customer's middle name, the tab key 94—4 is again actuated to tab the typewriter to carriage position VII and to drop out the relay K138 which was picked up upon the closing of timing cam switch S55 during the cycle initiated from the typing of the first letter of the customer's middle name. Again, no skipping of the card punch machine will take place, as the relay K112 was not energized and the carriage was off of a punch indication pin when the tab key 94—4 was depressed after typing the last letter "E" of the middle name of the customer. The program cards will be setting at column 69 and the detail card at column 68 in which it was punched for the first letter "P" of the customer's middle name typed from carriage position VI.

With the typing of the first letter "D" of the customer's surname in punch active carriage position VII, the aforesaid circuit will again be completed through now closed lane switch S32 to pulse the typewriter character read out switch for the letter "D," to pick the card punch interposers for this letter and to punch the code for this letter upon the escapement of the detail card to column 69. The auxiliary program card will now be sitting in column 70 where the #12 star wheel will find a hole therein to energize the word length control relay K112. Relay K112 then transfers its contacts, including K112–D to supply card ground potential from the transferred contacts K106–C of the card sensing control relay K106 to timing switch S54 actuated by the typewriter cam T1. Thus, upon ensuing typing operations in carriage position VII, card ground potential is supplied through the transferred K112–D contacts to timing cam switch S54 on each typewriter cycle to pulse the character read out switches actuated from the serially selected typewriter keys and cause corresponding punching operations for the remaining letters of the customer's surname being typed in this position of the typewriter carriage.

Turning now to a description of the alpha punch discrimination feature of the card punch control unit of the present invention, this feature is effective in typewriter carriage positions from which punching of the card punch machine is not desired and functions to retain the card punch machine disabled as the typing continues over carriage positions where punching otherwise would have been enabled had the typing originally commenced in one of said otherwise punch active carriage positions. With respect to FIG. 17D, assume that after the typing of the last name of the customer had been completed, the typewriter carriage is returned upon depression of return key 94—2 to carriage position V containing an alpha punch indication pin and that it is desired to print the customer's address, 123 Ashton Road, on the following line of typing after vertical spacing of the platen, but that it is not desired to punch the customer's address in the detail card.

Depression of the return key 94—2 skips the detail card 323 from column 71 in which it received an "E" code punch to column 74, the end of the punch field allotted therein to the customer's surname typed from carriage position VII under the control of the field definition programming of the front program card 381, since the word length relay K112 was still energized after the typing of the last letter "E" of the customer's surname and switch 220—2 operated by the RET 2 key is programmed to the skip terminal of the plugboard. The program cards will thus be positioned at column 75 and do not have a perforation in zone 12 of this column to which they have been skipped.

The space bar 92 on the typewriter keyboard is actuated to initiate a non-printing typewriter cycle and to escape the carriage one letter space position off of the lane 37 punch indication pin, thereby indenting the address portion one letter space from the first letter. Although the carriage was originally at position V, which contained a punch indication pin 55' in lane 37, control relay K138 is not energized when timing cam switch S54 closes at 30 degrees of the space bar initiated typewriter cycle. Therefore, "OV" potential, which is available at the space bar actuated switch S86 over a circuit traced from S32, conductor 536, the normally closed contacts K138–B of the yet de-energized relay K138, contacts K112–D lower, and S54, cannot be supplied through the normally open contacts K138–A of the relay K138, and no spacing operation of the card punch machine can take place.

At 158 degrees of the space bar initiated typewriter cycle, timing cam T2 closes to supply "O*v*" from the control unit power supply to the low potential side of the control relay K138, the high potential side of which is connected to the plus output supply terminal, thereby energizing the relay which transfers its contacts and establishes a holding circuit therefor through its contacts K138–C. As the auxiliary program card 382 is still located at the same column position, column 75, as when the space bar 92 was depressed, no spacing operation of the card punch machine having occurred as described, the #12 star wheel actuated switch thereof will still be open due to the absence of a perforation in zone 12 of this column thereof. The word length control relay K112 will still be de-energized and card ground potential will not be available from its contacts K112–D to pulse the character read out switches for the subsequent operations of the typewriter.

Thus typing of the customer's address portion on the sheet in the typewriter platen may be initiated without resulting in punching operations of the detail card in the card punch machine. As the typing of this line continues and the carriage arrives at carriage position VI containing a punch indication pin in lane 37 thereof, lane switch S32 again closes and supplies Ov from the control unit power supply to one side of contacts K138–B of the control relay K138. However, since this relay is still energized, the circuit from S32 is interrupted by the transferred contacts K138–B and punching of the card punch machine remains disabled.

It can be seen that in the absence of the punch discrimination control relay K138, a circuit would have been established to the character read out switches when the typewriter carriage arrived at active carriage position VI to close S32 and would initiate undesired card punching under the foregoing situation where the typing commenced in an inactive carriage position from which it is desired to retain the card punch machine disabled during the typing of the address data on the sheet on the carriage platen. Thus, the presence of the control relay K138, connected in the described control circuit, discriminates against undesired punching operations that would otherwise occur when the typing commences in an inactive carriage position and continues over active punch indication positions provided for typing and punching of "live" data initiated from active punch positions. In this manner conventional typing formats can be accommodated readily by the apparatus of the present invention without the necessity of assigning separate typing fields on the typewriter platen sheet for "live" and inactive punch data, as would otherwise be the case in the absence of the punch discrimination feature described.

With the completion of the typing of the customer's address which was not punched in the detail card as described above, the tab key 94—4 is again depressed to actuate switch S95 and drop out the relay K138 and to tab the carriage to stop position VIII containing an alpha punch indication pin therein. As the program cards were sitting in blank column 75 to which they were skipped upon completion of the typing and punching of the customer's name and because of the absence of a punch indication pin in the carriage position at the end of the customer's address last typed on the sheet 35, no escapement of the program cards and the detail card will take place when the tab key 94—4 was depressed following the typing of the last letter of the customer's address.

Carriage stop position VIII is shown assigned to a zone number, i.e. 46, which is to be typed from the numerical keys of the typewriter keyboard and is to be punched in columns 75 and 76 of the detail card. Upon the completion of the typing and punching of this information, the program cards will be sitting at their column 77 position, one column in advance of column 76 of the detail card shown as having received a 6 punch therein, columns 77 through 80 of the program cards being punched as shown.

With the completion of the typing and punching of the information from carriage position VIII containing an alpha punch indication pin therein, the return key 94—1 is actuated to drop out the relay K138 and to space and return the carriage to stop position I. The return key 94—1 has its switch contacts 21—1 connected to the rear of the Ret 1 hub J,19 of the plugboard 454, which terminal is patch wired on the face of the plugboard to hub K,22, a distributor entry hub. As described in application S.N. 747,005, each of the distributor entry hubs, as hub K,22, is connected from the rear of the plugboard and through two isolation diodes, as 542 and 543, to two distributor exit hubs K,23 and K,24 which are associated with hub K,22 and are shown herein patch wired on the face of the plugboard to the X-Skip hub G,16, and to the card entry hub C,12, respectively. The X-Skip hub is connected over conductors 546, 547 and 548 to the X-Skip relay 45 and the #11 interposer to cause an X-Skip operation therein, which is similar to the previously described skip operation from tab key 94—4 in carriage position IV, except that an 11 interposer is energized with the X-Skip relay in place of the space interposer, resulting in the punching of an 11 prior to skipping. The pulse applied to the card entry hub C,12, from the distributor exit hub K,24, also pulses the #12 interposer simultaneously with the pulsing of the 11 interposer from the X-Skip hub so that a 12 and an 11 are punched in column 77 of the detail card prior to the skipping of the cards under the control of the field definition programming in columns 75 through 80 of the front program card.

Thus in this manner, the detail card 323 can be punched with a special code, a 12 and 11, in the column, column 77, immediately following the last item punched therein, which was the last numeral of the zone number typed from carriage position VIII and punched in card column 76, and the detail card can be skipped out of the card punch machine thereafter under the field definition programming of the front program drum, both accomplished upon the actuation of the return key 94—1 to return the carriage to stop position I. The special code in column 77 of the detail card can be interpreted by the reading apparatus subsequently to be used for the interpretation of the cards as an end of word code which may be of special significance where the punched cards are to be used for a card input system to a computer, business machine or card input controlled device.

After the carriage is returned to stop position I, either the accounting machine section or the typewriter section of the combined typewriter-accounting machine may be operated for punching of the next detail card depending upon the presence of a numerical or alphabetical punch indication pin in this carriage position. In fact, both kinds of pins can be provided in lanes 31 and 37 of this carriage position and any of the punch active carriage positions so that numerical or alphabetical punching of the detail card can be had depending upon whether the accounting section or typewriter section is operated. Where the typewriter section is operated after the carriage has returned to stop position I, the binary coding of rows 0, 1, 2 and 3 of columns 1 through 11 of the auxiliary program card 382 of FIG. 17A will be ignored and alphabetical data may be punched in these columns of the detail card over a field determined by the length of the word length programming of the card 382. Thus, various ones or all of the fields of the auxiliary program card can be provided with binary code perforations in the aforesaid rows thereof to provide for numerical punching control of the card punch machine from the accounting machine in the designated fields in the event the accounting machine section should be operated in lieu of the typewriter in the previously described alpha punching control positions of the machine carriage, thereby considerably increasing the programming and format flexibility available from the typewriter accounting machine 2.

By reason of the alternate program control feature described in applicant's earlier applications, the lower halves of the auxiliary program card and the regular program card can be employed to provide a different format for alpha and numerical punching controls from the typewriter-accounting machine over different fields of control of the detail card, thereby further increasing the flexibility and compatibility of the system to various posting formats of the medium 35. It is appreciated, of course, that the medium 35 is receiving printed impressions from the typewriter-accounting machine while the detail card is being punched as a direct by-product of the normal operation of the typewriter-accounting machine.

What is claimed is:

1. The combination with a typewriter machine including a platen carriage movable to successive character space positions, a keyboard of alphabetical characters and a plurality of character printing type elements selectively actuable from said keyboard, and with a column by column card punch machine including a plurality of punch element control means selectively energizable in different combinations for alphabetical punching of a detail card, programming means including a program card having control indicia in columns thereof regulating the punching of the detail card over data receiving fields therein corresponding to control fields of the program card, means for sensing control indicia in the program card, and means for advancing the program card and the detail card column by column past said sensing means and the punching elements, respectively, upon energization of any one of said punch element control means; of, control means interconnecting said machines controlling the operation of the card punch machine from the typewriter machine and including switching means operated at a predetermined character space position of the carriage of the typewriter enabling an operation of the card punch machine from a typing operation initiated from any one of the keys of the typewriter machine in that carriage space position thereof, and further switching means operated from said control indicia sensing means of the card punch machine and controlling the continued operation thereof for successive subsequent character space typing operations initiated from any one of the keys of the typewriter machine over a data receiving field of the detail card in accordance with the extent of the control indicia in a corresponding control field of the program card and irrespective of the numerical correspondence of the control indicia in a column of the program card with the typewriter key operated for that column of the detail card.

2. The combination with a typewriter machine including a platen carriage movable to successive character space positions and spaced tab stop positions, a keyboard of alphabetical character keys and functional control keys including a carriage tabulation control key, and a plurality of character printing type elements selectively actuable from said keyboard, and with a column by column card punch machine having a plurality of punch element control means selectively energizable in different combinations for alphabetical punching of a detail card and a plurality of functional control means controlling functional operations of the card punch machine including column skipping control means, programming means including a program card having control indicia in columns thereof regulating the punching of the detail card over data receiving fields therein in accordance with the control indicia in corresponding control fields of the program card, means for sensing control indicia in the program card, and means for advancing the program card and the detail card column by column past said sensing means and punch elements, respectively, upon energization of any one of said punch element control means or functional control means of the card punch machine; of, control means interconnecting said machines controlling the operation of the card punch machine from the typewriter machine and including switching means operated at predetermined spaced tab stop positions of the carriage of the typewriter machine enabling an operation of the card punch machine from a character space typing operation of the typewriter initiated at any one of said carriage stop positions from any one of the typewriter keys thereof, switching means operated from said control indicia sensing means of the card punch machine and controlling the continued operation thereof for successive subsequent character space typing operations initiated from any one of the typewriter keys over a data receiving field of the detail card in accordance with the extent of the control indicia in a corresponding control field of the program card, and switching means operated upon actuation of the typewriter carriage tabulation control key upon completion of typing of a word or quantity commencing in one of said tab stop positions and terminating in advance of the next tab stop position and connected to said skipping control means of said card punch machine to initiate skipping of the detail card and program card a number of card columns thereof to the end of the control field in the program card.

3. The combination with a typewriter machine including a platen carriage movable to successive character space positions and spaced tab stop positions, a key board of alphabetical character keys and functional control keys including a carriage tabulation control key, and a plurality of character printing type elements selectively actuable from said keyboard, and with a column by column card punch machine having a plurality of punch element control means selectively energizable in different combinations for alphabetical punching of a detail card and a plurality of functional control means controlling functional operations of the card punch machine including column skipping control means, programming means including a program card having control indicia in columns thereof regulating the punching of the detail card over data receiving fields therein incordance with the control indicia in corresponding control fields of the program card, means for sensing control indicia in the program card, and means for advancing the program card and the detail card column by column past said sensing means and said punch elements, respectively, upon energization of any one of said punch element control means or functional control means of the card punch machine; of, control means interconnecting said machines controlling the operation of the card punch machine from the typewriter machine and including switching means operated at predetermined spaced tab stop positions of the carriage of the typewriter machine enabling an operation of the card punch machine from a character space typing operation of the typewriter initiated at any one of said stop positions from any one of the keys thereof, switching means operated from said control indicia sensing means of the card punch machine and controlling the continued operation thereof for successive subsequent character space typing operations initiated from any one of the typewriter keys over a data receiving field of the detail card in accordance with the extent of the control indicia in a corresponding field of the program card coextensive with a typing field of the typewriter, and switching means operated upon actuation of the carriage tabulation control key upon completion of typing of a word or quantity commencing in one of said carriage stop positions and terminating in advance of the next tab stop position and connected to said skipping control means of said card punch machine to initiate skipping of the detail card and program card a number of card columns thereof corresponding to the number of letter space positions skipped by the typewriter from the operation of the tabulation key thereof.

4. The combination with a typewriter machine including a platen carriage movable to successive character space positions, a keyboard of alphabetical character keys and a plurality of character printing type elements selectively actuable from said keyboard, and with a column by column card punch machine having a plurality of punch element control means selectively energizable in different combinations for alphabetical punching of a detail card, programming means including a program card having control indicia in columns thereof regulating the punching of the detail card in punch receiving fields therein over corresponding control fields of the program card, means for sensing control indicia in the program card, and means for advancing the program card and the detail card column by column past said sensing means and punch elements, respectively, upon energization of any one of said punch element control means; of, control means interconnecting said machines controlling operation of the card punch machine from selected character space typing operations of the typewriter and effecting an abbreviated or shortened punching in the detail card of a whole word or quantity typed on the typewriter, said control means including switching means operated at a predetermined position of the carriage of the typewriter enabling a punching operation in the card punch machine initiated from a typing operation of the typewriter in that carriage position from any one of the typewriter keys irrespective of the numerical correspondence of the control indicia in the column of the program card with the typewriter key operated for that column of the detail card, and further switching means under the control of said program card control indicia sensing means of the card punch machine disabling further operation of the card punch machine for subsequent character space typing operations initiated from any one of the typewriter keys in subsequent character space positions thereof for the remainder of the word or quantity being typed therein.

5. In combination, a power operated typewriter machine including a normally disengaged cyclically operable power actuating means, means operable to release said power actuating means, a platen carriage movable to successive character space positions, a plurality of character printing type elements and a keyboard of alphabetical character keys controlling the selection of said type elements and the operation of said release means to initiate an operating cycle of said power actuating means, a step by step record punch machine having a plurality of punch element control means selectively energizable in different combinations for alphabetical punching of record media therein, and control means interconnecting said machines controlling the operation of the punch machine from the typewriter machine, said control means including a potential supply source having one side connected to one side of each of said punch element control means, a character read-out switch for each of the typewriter character keys, an encoder connecting one side of each of said character read-out switches to the other side of different combinations of said punch element control means in accordance with the desired alphabetical code punching of the record media and switching means operated from said typewriter power actuating means upon initiation of a cycle of operation thereof and having one side connected to the other side of each of said character read-out switches and its other side connected to the other side of said potential supply source.

6. In combination, a power operated typewriter machine including a normally disengaged cyclically operable power actuating means, means operable to release said power actuating means, a platen carriage movable to successive character space positions and spaced tab stop positions, a plurality of character printing type elements and a keyboard of alphabetical character keys controlling the selection of said type elements and the operation of said release means to initiate an operating cycle of said power actuating means, a step by step record punch machine having a plurality of punch element control means selectively energizable in different combinations for alphabetical punching of record media therein, and control means interconnecting said machines controlling the operation of the punch machine from the typewriter machine, said control means including a potential supply source having one side connected to one side of each of said punch element control means, a character read-out switch for each of the typewriter character keys, an encoder connecting one side of each of said character read-out switches to the other side of different combinations of said punch element control means in accordance with the desired alphabetical code punching of the media, first switching means operated from said typewriter power actuating means upon intiation of a cycle of operation thereof and having one side connected to the other side of each of said character read-out switches, second switching means operated at a predetermined tab stop position of the typewriter carriage enabling a punching operation of the punch machine from a character space typing operation of the typewriter in that stop position thereof and having one side connected to the other side of said first switching means and its other side connected to the other side of said potential supply source, and third switching means operated from said punch machine and connected across said second switching means enabling continued operation of the punch machine for subsequent character space typing operations initiated from any one of the typewriter keys in subsequent character space positions of the carriage thereof removed from said tab stop position.

7. The combination with a power operated typewriter machine including cyclically operable power actuating means, a platen carriage movable to successive character space positions, a plurality of character printing type elements and a keyboard of alphabetical character keys controlling the selection of said type elements and the initiation of an operating cycle of said power actuating means, and a column by column card punch machine having a plurality of punch element control means selectively energizable in different combinations for alphabetical punching of a detail card, programming means including a program card having control indicia in columns thereof regulating the punching of the detail card in a data receiving field therein over a corresponding control field of the program card, means for sensing control indicia in the program card, and means for advancing the program card and the detail card column by column past said sensing means and punch elements, respectively, upon energization of any one of said punch element control means or functional control means; of, control means interconnecting said machines controlling the operation of the card punch machine from the typewriter machine and including a potential supply source having one side connected to one side of each of said punch element control means, a character read-out switch for each of the typewriter character keys, an encoder connecting one side of each of said character read-out switches to the other side of different combinations of said punch element control means in accordance with the desired alphabetical code punching of the detail card, switching means operated from said typewriter power actuating means upon initiation of a cycle of operation thereof and having one side connected to the other side of each of said character read-out switches, other switching means operated at predetermined carriage stop positions enabling an operation of the card punch machine initiated from any one of the keys of the typewriter machine at any one of said carriage stop positions and having one side connected to the other side of said aforementioned switching means and its other side connected to the other side of said potential supply source, and further switching means connected across said other switching means and operated from said control indicia sensing means of the card punch machine for controlling the continued operation thereof for successive character space typing operations initiated from any one of the keys of the typewriter machine over punch receiving fields of the detail card coextensive with or less than the corresponding typing field of the typewriter machine in accordance with the extent of the control indicia in a corresponding control field of the program card and irrespective of the numerical correspondence of the control indicia in a column of the program card with the typewriter key operated for that column of the detail card.

8. The combination with a power operated typewriter machine including cyclically operable power actuating means, a platen carriage movable to successive character space positions and spaced tab stop positions, a plurality of charter printing type elements and a keyboard of alphabetical and numerical character keys and a carriage tabulation control key controlling the initiation of an operating cycle of said power actuating means upon actuation of any one of said keys, and a column by column card punch machine having a plurality of punch element control means selectively energizable singly and in different combinations for numerical and alphabetical punching of a detail card and a plurality of functional control means controlling functional operations of the card punch machine including columnar skipping control means, programming means including a program card having control indicia in columns thereof regulating the punching of the detail card in data receiving fields therein over corresponding control fields of the program card, means for sensing control indicia in the program card, and means for advancing the program card and the detail card column by column past said sensing means and punching elements, respectively, upon energization of any one of said punch element control means; of, control means interconnecting said machines controlling the operation of the card punch machine from the typewriter machine and including a potential supply source having one side connected to one side of each of said punch element control means and functional control means, a character read-out switch for each of the typewriter character keys, an encoder connecting one side of each of said character read-out switches to the other side of different ones and combinations of said punch element control means in accordance with the desired alpha-numerical code punching of the detail card, switching means operated from said typewriter power actuating means upon initiation of a cycle of operation thereof and having one side connected to the other side of each of said character read-out switches, other switching means operated at predetermined carriage tab stop positions enabling an operation of the card punch machine from any one of the keys of the typewriter at any one of said carriage stop positions and having one side connected to the other side of said first mentioned switching means and its other side connected to the other side of said potential supply, further switching means connected across said other switching means and operated from said control indicia sensing means of the card punch machine for controlling the continued operation thereof for successive character space typing operations from any one of the keys of the typewriter machine over punch receiving fields of the detail card coextensive with or less than the corresponding typing field of the typewriter machine in accordance with the extent of the control indicia in a corresponding control field of the program card, and irrespective of the numerical correspondence of the control indicia in a column of the program card with the typewriter key operated for that column of the detail card, and additional switching means operated upon actuation of the typewriter carriage tabulation control key upon completion of typing of a word or quantity commencing in one of said tab stop positions and terminating in advance of the next tab stop position and connected to said skipping control means of said card punch machine to initiate skipping of the detail card and program card a number of card columns to the end of the control field in the program card.

9. The combination with a typewriter machine including a platen carriage movable to successive character space positions and spaced tab stop positions, a keyboard of alphabetical character keys and functional control keys including a carriage tabulation control key, and a plurality of character printing type elements selected from said keyboard, and with a column by column card punch machine having a plurality of punch element control means selectively energizable in different combinations for alphabetical punching of a detail card and a plurality of functional control means controlling functional operations of the card punch machine including columnar skipping control means, programming means including a program card having control indicia in columns thereof regulating the punching of the detail card in data receiving fields therein over corresponding control fields of the program card, means for sensing control indicia in the program card, and means for advancing the program card and the detail card column by column past said sensing means and punch elements, respectively, upon energization of any one of said punch element control means or functional control means of the card punch machine; of, control means interconnecting said machines controlling the operation of the card punch machine from the typewriter and including switching means operated at predetermined spaced tab stop positions of the carriage of the typewriter machine enabling an operation of the card punch machine from a character space typing operation initiated from any one of the keys of the typewriter in any one of said predetermined stop positions thereof, switching means operated from said control indicia sensing means of the card punch machine and controlling the continued operation thereof for subsequent character space typing operations initiated from any one of the character space typing keys over data receiving fields of the detail card coextensive with or less than the corresponding typing field of the typewriter in accordance with the extent of the control indicia in a corresponding control field of the program card and irrespective of the numerical correspondence of the initial indicia in a column of the program card with the typewriter key operated for that column of the detail card, switching means operated upon actuation of the typewriter carriage tabulation control key upon completion of typing of a word or quantity commencing in one of said predetermined tab stop positions and terminating in advance of the next tab stop position and connected to said skipping control means of said card punch machine to initiate skipping of the detail card and program card over a number of card columns determined by the extent of the control field indicia in the program card, and interlock control means operated from the card punch machine upon initiation of a skipping operation therein inhibiting further operation of the typewriter in said next tab stop position until completion of the skipping operation of the card punch machine.

10. The combination with a typewriter machine including a platen carriage movable to successive character space positions and spaced tab stop positions, a keyboard of alphabetical character keys and functional control keys including a tabulation control key, and a plurality of character printing type elements selected from said keyboard, and with a column by column card punch machine having a plurality of punch element control means selectively energizable in different combinations for alphabetical punching of a detail card and a plurality of functional control means controlling functional operations of the card punch machine including columnar skipping control means, programming means including a program card having control indicia in columns thereof regulating the punching of the detail card in data receiving fields therein over corresponding control fields of the program card, means for sensing control indicia in the program card, and means for advancing the program card and the detail card column by column past said sensing means and punch elements, respectively, upon energization of any one of said punch element control means or functional control means of the card punch machine; of, control means interconnecting said machines controlling the operation of the card punch machine from the typewriter and including switching means operated at predetermined spaced tab stop positions of the carriage of the typewriter machine enabling an operation of the card punch machine from a character space typing operation initiated from any one of the keys of the typewriter in any one of said predetermined stop positions thereof, switching means operated from said control indicia sensing means of the card punch machine and controlling the continued operation thereof for subsequent character space typing operations initiated from any one of the typewriter keys over data receiving fields of the detail card coextensive with or less than the corresponding typing field of the typewriter in accordance with the extent of the control indicia in a corresponding control field of the program card and irrespective of the numerical correspondence of the initial indicia in a column of the program card with the typewriter key operated for that column of the detail card, switching means operated upon actuation of the tabulation control key of the typewriter upon completion of typing of a word or quantity commencing in one of said tab stop positions and terminating in advance of the next tab stop position and connected to said skipping control means of said card punch machine to initiate skipping of the detail card and program card over a number of card columns determined by the extent of the control field indicia in the program card, and selectively operable interlock control means controlled jointly from the card punch machine upon initiation of a skipping operation therein and from said first mentioned switching means inhibiting further operaton of the typewriter in said next tab stop position until completion of the skipping operation of the card punch machine.

11. The combination with a typewriter machine including a platen carriage movable to successive character space positions and carriage tab and return stop positions, a keyboard of alphabetical character keys and functional control keys including carriage tabulation and return control keys, and a plurality of character printing type elements selected from said keyboard, and with a record punch machine having a plurality of punch element control means selectively energizable in different combinations for alphabetical punching of record media therein; of, control means interconnecting said machines controlling the operation of the punch machine from the typewriter and including switching means responsive to and operated during tabulation or return movement of the carriage of the typewriter, and typewriter keyboard interlock control means controlled by said switching means during tabulation or return movement of the typewriter initiated from a tabulation or return control key thereof and inhibiting further operation of the typewriter during tabulation or return movement thereof.

12. The combination with a typewriter machine including a platen carriage movable to successive character space positions and tab stop positions, a keyboard of alphabetical character keys and functional control keys including a carriage tabulation control key, and a plurality of character printing type elements selected from said keyboard, and with a column by column card punch machine having a plurality of punch element control means selectively energizable in different combinations for alphabetical punching of a detail card and a plurality of functional control means controlling functional operations of the card punch machine including columnar skipping control means, programming means including a program card having control indicia in columns thereof regulating the punching of the detail card in data receiving fields therein over corresponding control fields of the program card, means for sensing control indicia in the program card, and means for advancing the program card and the detail card column by column past said sensing means and punch elements, respectively, upon energization of any one of said punch element control means or functional control means of the card punch machine; of, control means interconnecting said machines controlling the operation of the card punch machine from the typewriter and including switching means operated at predetermined spaced tab stop positions of the carriage of the typewriter machine enabling an operation of the card punch machine from a character space typing operation initiated from any one of the keys of the typewriter in any one of said predetermined stop positions thereof, switching means operated from said control indicia sensing means of the card punch machine and controlling the continued operation thereof for subsequent character space typing operations initiated from any one of the character space typing keys over data receiving fields of the detail card coextensive with or less than the corresponding typing field of the typewriter in accordance with the extent of the control indicia in a corresponding control field of the program card and irrespective of the numerical correspondence of the initial indicia in a column of the program card with the typewriter key operated for the corresponding column of the detail card, switching means operated upon actuation of a tabulation control key of the typewriter upon completion of typing of a word commencing in one of said predetermined tab stop positions and terminating in advance of the next tab stop position and connected to said skipping control means of said card punch machine to initiate skipping of the detail card and program card over a number of card columns determined by the extent of the control field indicia in the program card, additional switching means responsive to and operated during tabulation movement of the typewriter carriage, and typewriter keyboard interlock control means operated initially from said last mentioned switching means inhibiting operation of the typewriter during tabulation movement of the typewriter carriage and retained operable thereafter from the card punch machine upon initiation of a skipping operation therein inhibiting operation of the typewriter after it has moved to the said next tab stop position thereof until completion of the skipping operation of the card punch machine.

13. In combination, a typewriter machine having a movable carriage and a keyboard, a cyclically operable record punching machine, and control means interconnecting said machines controlling the operation of the punching machine from the typewriter machine including means operable at a plurality of different preselected carriage positions of the typewriter enabling a cycle of operation of the punching machine upon operation of the typewriter in any one of said pre-selected carriage positions, means operable upon initiation of a punch cycle from a typewriter operation initiated in one of said preselected carriage positions enabling subsequent punching operations of the punching machine from successive character space typing operations from any one of the keys of the typewriter following the typing operation initiated in any one of said preselected carriage positions, and means operable upon initiation of the operation of the typewriter disabling operation of the punching machine from the typewriter when letter space typing is initiated at positions other than said preselected carriage positions and is continued past any of the preselected carriage positions from one of said other positions at which the first mentioned means is ineffective to enable a cycle of operation of the punching machine and the second mentioned means is ineffective to maintain the punching machine under the control of the typewriter.

14. In combination, a typewriter machine having a movable carriage and a keyboard, a cyclically operable record punching machine, and control means interconnecting said machines controlling the operation of the punching machine from the typewriter machine including first means operable at a plurality of different preselected carriage positions of the typewriter enabling a cycle of operation of the punching machine upon operation of the typewriter in any one of said preselected carriage positions, second means operable upon initiation of a punch cycle from a typewriter operation initiated in one of said preselected carriage positions enabling subsequent punching operations of the punching machine from successive character space typing operations from any one of the keys of the typewriter keyboard following the typing operation initiated in any one of said preselected carriage positions, third means operable upon initiation of the operation of the typewriter for disabling operation of the punching machine from the typewriter when successive character space typing is initiated at positions other than said preselected carriage positions and is continued past any of the preselected carriage positions from one of said other positions at which the first mentioned means is ineffective to enable a cycle of operation of the punching machine and the second mentioned means is ineffective to maintain the punching machine under the control of the typewriter, and means operable from the typewriter for disabling said third mentioned means.

15. The combination with a power operated typewriter machine including cyclically operable power actuating means, a platen carriage movable to successive character space positions, a plurality of character printing type elements and a keyboard of alphabetical character keys controlling the selection of said type and the initiation of an operating cycle of said power actuating means to actuate a selected one of said type elements and effect a character space movement of the typewriter carriage, and a column by column card punch machine having a plurality of punch element control means selectively energizable in different combinations for alphabetical punching of a detail card, programming means including a program card having control indicia in columns thereof regulating the punching of the detail card in data receiving fields therein over corresponding control fields of the program card, means for sensing control indicia in the program card, and means for advancing the program card and the detail card column by column past said sensing means and punch elements, respectively, upon energization of any one of said punch element control means; of, control means interconnecting said machines controlling the operation of the card punch machine from the typewriter and including a potential supply source having one side connected to one side of each of said punch element control means, a character read-out switch for each of the typewriter character keys, an encoder connecting one side of each of said character read-out switches to the other side of different combinations of said punch element control means in accordance with the desired alphabetical code punching of the detail card, first switching means operated from said typewriter power actuating means upon initiation of a cycle of operation thereof and having one side connected to the other side of each of said character read-out switches, second switching means operated at predetermined carriage stop positions enabling a punching operation of the card punch machine from any one of the typewriter keys in any one of said predetermined carriage stop positions thereof and having one side connected to the other side of said potential supply source, third switching means controlled from said typewriter power actuating means after the operation of said first switching a means to disable said second switching means and having a pair of switch contacts connected between the other sides of said first and second switching means, and fourth switching means operated from said control indicia sensing means of the card punch machine and having one side connected to the other side of said first switching means and its other side connected to the other side of said potential supply source.

16. In combination, a combined cyclically operable accounting and power operated typewriter machine having a common carriage movable in columnar stop and letter space increments, an accounting machine section including a keyboard for indexing multi-denominational numerical information therein at different columnar stop positions of the carriage and a typewriter section including a keyboard of alpha-numerical character keys for successive character space typing operations at successive character space positions of the carriage, a step by step cyclically operable record punch machine, and control means interconnecting the accounting and typewriter machine with the punch machine for numeric punching from the accounting machine section upon initiation of a cycle of operation thereof in one of said columnar carriage stop positions and for alpha-numeric punching from successive character space typing operations in successive character space positions of the carriage thereof, said control means including switching means responsive to operation of the accounting machine section in one of said columnar stop positions and disabling operation of the keyboard of the typewriter section during numeric punching operations of the punch machine initiated from the accounting machine section.

17. In combination, a combined cyclically operable accounting and power operated typewriter machine having a common carriage movable in columnar stop and letter space increments, an accounting machine section including a keyboard for indexing multi-denominational numerical information therein at different columnar stop positions of the carriage and a typewriter section including a keyboard of alpha-numerical character keys for successive character space typing operations at successive character space positions of the carriage, a step by step cyclically operable record punch machine, and control means inter-connecting the accounting and typewriter machine with the punch machine for numeric punching from the accounting machine section upon initiation of a cycle of operation in one of said columnar stop carriage positions thereof and for alpha-numeric punching from successive random character space typing operations initiated from any one of the keys of the typewriter section in successive character space carriage positions thereof, said control means including switching means controlled by said accounting machine section preventing punching control operations of the punch machine from the accounting machine section during alpha-numeric punch control operations of the punch machine initiated from the typewriter section.

18. In combination, a combined cyclically operable accounting and power operated typewriter machine having a common carriage movable in columnar stop and letter space increments, an accounting machine section including a keyboard for indexing multi-denominational numerical information therein at different columnar stop positions of the carriage and a typewriter section including a keyboard of alpha-numerical character keys for successive character space typing operations at successive character space positions of the carriage, a step by step cyclically operable record punch machine, and control means interconnecting the accounting and typewriter machine with the punch machine for numeric punching from the accounting machine section upon initiation of a cycle operation thereof in one of said columnar stop carriage positions and for alpha-numeric punching from random successive character space typing operations initiated from any one of the keys of the keyboard of the typewriter section in successive character space carriage positions thereof, said control means including carriage position actuated switching means enabling operation of the punch machine from either section of the combined typewriter accounting machine, and control switching means responsive to operation of the accounting machine section in one of said columnar stop positions and disabling operation of the keyboard of the typewriter section during numeric punching control operations of the punch machine initiated from the accounting machine section, said last named means preventing numeric punching control operations of the punch machine from the accounting machine section during alpha-numeric punch control operations of the punch machine initiated from the typewriter section of the combined typewriter accounting machine.

19. In a combined cyclically operable accounting and power operated typewriter machine having a common carriage movable in coumnar stop and letter space increments, an accounting machine section including a keyboard and a plurality of gang operated printing elements for indexing and printing multi-denominational numerical information at different columnar stop positions of the carriage and a typewriter section including a keyboard of alpha-numerical character keys and a plurality of character printing elements successively operable at successive letter space printing positions of the carriage, a cyclically operable record punch machine including punching means and a plurality of selectively energizable punch control means, and control means interconnecting the accounting and typewriter machine with the punch machine for numeric punching from the accounting machine section upon initiation of a cycle of operation thereof in one of said columnar carriage stop positions and for alpha-numerical punching from successive letter space typing operations in successive letter space carriage positions of the typewriter section thereof, said control means including a power supply having one side connected to one side of each of said punch control means, means sensing multi-denominational numerical informational entered in the accounting machine section including a plurality of decimal storage read-out switches each having a plurality of numerical data outputs connected to the other side of respectively corresponding punch control means and an input individual to each of said switches, a plurality of character read-out switches selectively operable from the typewriter keyboard and connected in typewriter punch control circuits extending from the other side of the power supply to one side of each of the character read-out switches and from the other side of each of said read-out switches to the other side of different ones and combinations of the punch control means in accordance with the desired alpha-numerical code to be punched by said record punch machine from any one of the typewriter keys, step by step selecting means operated from said record punch machine connecting the inputs of predetermined ones of said decimal read-out switches in succession to the other side of said power supply, switching means connected in circuit between the other side of said power supply and said selecting means and operable upon initiation of a cycle of operation of the accounting machine section to complete a circuit therethrough from the other side of the power supply to the selecting means for a first one of the decimal read-out switches to be read in one of the columnar stop carriage positions of the accounting machine section, switching means operable from said record punch machine upon initiation of a cycle of operation thereof from the accounting machine section and connected across said accounting machine section operated switching means to complete a circuit therethrough from the other side of the power supply to the selecting means for successive ones of said decimal read-out switches subsequently selected by said selecting means to be read in said columnar stop position of the accounting machine section, and circuit disabling means controlled from said accounting machine section interrupting said circuits between the other side of the power supply and said selecting means when the record punch machine is operated from the typewriter section for alpha-numerical punching therefrom.

20. The combination with a typewriter machine including a platen carriage movable to successive character space positions, a keyboard of alphabetical character keys and a plurality of character printing type elements selectively actuable from said keyboard, and with a column by column card punch machine including a plurality of punch element control means selectively energizable in different combinations for alphabetical punching of a detail card, programming means including a program card having control indicia in columns thereof regulating the punching of the detail card over data receiving fields therein corresponding to control fields of the program card, means for sensing control indicia in the program card, and means for advancing the program card and the detail card column by column past said sensing means and the punching elements respectively, upon energization of any one of said punch element control means; of, control means interconnecting said machines controlling the operation of the card punch machine from the typewriter machine and including switching means operated at a predetermined character space position of the carriage of the typewriter enabling an operation of the card punch machine from a typing operation initiated from any one of the keys of the typewriter machine in that carriage space position thereof, said program card being characterized by the absence of a control indicium in the column of the control field thereof corresponding to the carriage space position of the typewriter at which said switching means is operated to enable an operation of the card punch machine from the typewriter, and further switching means operated from said control indicia sensing means of the card punch machine and controlling the continued operation thereof for successive subsequent character space typing operations initiated from any one of the keys of the typewriter machine over a data receiving field of the detail card in accordance with the extent of the control indicia in a corresponding control field of the program card and irrespective of the numerical correspondence of the control indicia in a column of the program card with the typewriter key operated for the corresponding column of the detail card.

21. The combination with a typewriter machine including a platen carriage movable to successive character space positions and spaced tab stop positions, a keyboard of alphabetical character keys and functional control keys including a carriage tabulation control key, and a plurality of character printing type elements selectively actuable from said keyboard, and with a column by column card punch machine having a plurality of punch element control means selectively energizable in different combinations for alphabetical punching of a detail card and a plurality of functional control means controlling functional operations of the card punch machine including column skipping control means, programming means including a program card having control indicia in columns thereof regulating the punching of the detail card over data receiving fields therein in accordance with the control indicia in corresponding control fields of the program card, means for sensing control indicia in the program card, and means for advancing the program card and the detail card column by column past said sensing means and punch elements, respectively, upon energization of any one of said punch element control means or functional control means of the card punch machine; of, control means interconnecting said machines controlling the operation of the card punch machine from the typewriter machine and including switching means operated at predetermined spaced tab stop positions of the carriage of the typewriter machine enabling an operation of the card punch machine from a character space typing operation of the typewriter initiated at any one of said carriage stop positions from any one of the typewriter keys thereof, said program card being characterized by the absence of a control indicium in the column of the control field thereof corresponding to the carriage tab stop position of the typewriter at which said switching means is operated to enable an operation of the card punch machine from the typewriter, switching means operated from said control indicia sensing means of the card punch machine and controlling the continued operation thereof for successive subsequent character space typing operations initiated from any one of the typewriter keys over a data receiving field of the detail card in accordance with the extent of the control indicia in a corresponding control field of the program card, and switching means operated upon actuation of the typewriter carriage tabulation control key upon completion of typing of a word or quantity commencing in one of said tab stop positions and terminating in advance of the next tab stop position and connected to said skipping control means of said card punch machine to initiate skipping of the detail card and program card a number of card columns thereof to the end of the control field in the program card.

22. The combination with a typewriter machine including a platen carriage movable to successive character space positions and spaced tab stop positions, a keyboard of alphabetical character keys and functional control keys including a carriage tabulation control key, and a plurality of character printing type elements selectively actuable from said keyboard, and with a column by column card punch machine having a plurality of punch element control means selectively energizable in different combinations for alphabetical punching of a detail card and a plurality of functional control means controlling functional operations of the card punch machine including column skipping control means, programming means including a program card having control indicia in columns thereof regulating the punching of the detail card over data receiving fields therein in accordance with the control indicia in corresponding control fields of the program card, means for sensing control indicia in the program card, and means for advancing the program card and the detail card column by column past said sensing means and said punch elements, respectively, upon energization of any one of said punch element control means or functional control means of the card punch machine; of, control means interconnecting said machines controlling the operation of the card punch machine from the typewriter machine and including switching means operated at predetermined spaced tab stop positions of the carriage of the typewriter machine enabling an operation of the card punch machine from a character space typing operation of the typewriter initiated at any one of said stop positions from any one of the keys thereof, said program card being characterized by the absence of a control indicium in the column of the control field thereof corresponding to the carriage tab stop position of the typewriter at which said switching means is operated to enable an operation of the card punch machine from the typewriter, switching means operated from said control indicia sensing means of the card punch machine and controlling the continued operation thereof for successive subsequent character space typing operations initiated from any one of the typewriter keys over a data receiving field of the detail card in accordance with the extent of the control indicia in a corresponding control field of the program card coextensive with a typing field of the typewriter, and switching means operated upon actuation of the carriage tabulation control key upon completion of typing of a word or quantity commencing in one of said carriage stop positions and terminating in advance of the next tab stop position and connected to said skipping control means of said card punch machine to initiate skipping of the detail card and program card a number of card columns thereof corresponding to the number of letter space positions skipped by the typewriter from the operation of the tabulation key thereof.

23. The combination with a typewriter machine including a platen carriage movable to successive character space positions, a keyboard of alphabetical characters and a plurality of character printing type elements selectively actuable from said keyboard, and with a column by column card punch machine having a plurality of punch element control means selectively energizable in different combinations for alphabetical punching of a detail card, programming means including a program card having control indicia in columns thereof regulating the punching of the detail card in punch receiving fields therein over corresponding control fields of the program card, means for sensing control indicia in the program card, and means for advancing the program card and the detail card column by column past said sensing means and punch elements, respectively, upon energization of any one of said punch element control means; of, control means interconnecting said machines controlling operation of the card punch machine from selected character space typing operations of the typewriter and effecting an abbreviated or shortened punching in the detail card of a whole word or quantity typed on the typewriter, said control means including switching means operated at a predetermined character space position of the carriage of the typewriter enabling a punching operation in the card punch machine initiated from a typing operation of the typewriter in that character space position from any one of the typewriter keys thereof, said program card being characterized by the absence of a control indicium in the column of the control field thereof corresponding to the carriage space position of the typewriter at which said switching means is operated to enable an operation of the card punch machine from the typewriter, and further switching means under the control of said program card control indicia sensing means of the card punch machine disabling further operation of the card punch machine for subsequent character space typing operations initiated from any one of the typewriter keys in subsequent character space positions thereof for the remainder of the word or quantity being typed therein.

References Cited in the file of this patent

UNITED STATES PATENTS

| | | |
|---|---|---|
| 2,318,299 | Doty | May 4, 1943 |
| 2,569,805 | Doty | Oct. 2, 1951 |
| 2,654,432 | Doty | Oct. 6, 1953 |